(12) United States Patent
Paparrizos et al.

(10) Patent No.: US 12,249,859 B2
(45) Date of Patent: Mar. 11, 2025

(54) ADAPTIVE POWER SYSTEMS AND TECHNIQUES

(71) Applicant: Qualcomm Incorporated, San Diego, CA (US)

(72) Inventors: Georgios Konstantinos Paparrizos, Foster City, CA (US); Haoyan Li, San Diego, CA (US); Cheong Kun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 849 days.

(21) Appl. No.: 17/331,522

(22) Filed: May 26, 2021

(65) Prior Publication Data

US 2021/0376643 A1    Dec. 2, 2021

Related U.S. Application Data

(60) Provisional application No. 63/030,835, filed on May 27, 2020.

(51) Int. Cl.
*H02J 7/00*    (2006.01)
*H02J 7/02*    (2016.01)

(52) U.S. Cl.
CPC ........ *H02J 7/00712* (2020.01); *H02J 7/0047* (2013.01); *H02J 7/02* (2013.01)

(58) Field of Classification Search
CPC ......... H02J 7/00712; H02J 7/0047; H02J 7/02
See application file for complete search history.

(56) References Cited

U.S. PATENT DOCUMENTS

| | | | |
|---|---|---|---|
| 11,923,715 B2* | 3/2024 | Song | H02M 3/33584 |
| 2012/0280648 A1 | 11/2012 | Hwang et al. | |
| 2016/0087472 A1 | 3/2016 | Sattinger et al. | |
| 2017/0093174 A1 | 3/2017 | Suetinov et al. | |
| 2018/0041060 A1* | 2/2018 | Walley | H02J 7/0045 |
| 2022/0231518 A1* | 7/2022 | Kun | H02M 1/0054 |

OTHER PUBLICATIONS

International Search Report and Written Opinion—PCT/US2021/034525—ISA/EPO—Nov. 23, 2021, 20 pages.
Partial International Search Report—PCT/US2021/034525—ISA/EPO—Aug. 16, 2021, 14 pages.

* cited by examiner

*Primary Examiner* — Richard V Muralidar
(74) *Attorney, Agent, or Firm* — Colby Nipper

(57) ABSTRACT

An apparatus is disclosed for adaptively providing power. In example implementations, an apparatus includes a power adapter coupler, at least one transistor, a first charger, and a second charger. The first charger and the second charger are coupled between the power adapter coupler and the transistor. The apparatus also includes a first switch, a second switch, and a charging controller. The first switch is coupled in series with the first charger between the power adapter coupler and the transistor. The second switch is coupled in series with the second charger between the power adapter coupler and the transistor. The charging controller is coupled to the first switch and the second switch. The charging controller is configured to selectively close the first switch to connect the first charger to the at least one transistor or close the second switch to connect the second charger to the at least one transistor.

27 Claims, 18 Drawing Sheets

ADAPTIVE POWER SYSTEMS AND TECHNIQUES

CROSS-REFERENCE TO RELATED APPLICATION

This application claims the benefit of U.S. Provisional Application No. 63/030,835, filed 27 May 2020, the disclosure of which is hereby incorporated by reference in its entirety herein.

TECHNICAL FIELD

This disclosure relates generally to providing power to electronic devices and, more specifically, to implementing adaptive power systems and techniques.

BACKGROUND

Portable electronic devices include traditional computing devices such as notebook computers, tablet computers, smartphones, wearable devices like a smartwatch or fitness tracker, and so forth. However, portable electronic devices also include other types of computing devices, such as personal voice assistants, thermostats and other automated controllers, smart speakers, power banks, security devices and other sensors, Internet of Things (IoT) devices, robots, drones, electric and hybrid vehicles, and so forth. These various electronic devices provide services relating to productivity, communication, social interaction, security, safety, remote management, entertainment, transportation, and information dissemination. Thus, portable electronic devices play crucial roles in many aspects of modern society.

Many of the services provided by portable electronic devices in today's interconnected world depend at least partly on the "portability" aspect of portable electronic devices. In other words, such portable electronic devices deliver additional benefits by being portable. To provide power to portable electronic devices, batteries are often employed. Batteries are reliable and portable energy sources that are used by a wide range of electronic devices, such as mobile phones, laptops, speakers, tablets, toys, power tools, medical device implants, electrically powered vehicles, and satellites. A battery, however, stores a fixed amount of charge that is depleted during mobile operation of the portable electronic device. Instead of requiring the purchase of a replacement battery, many batteries are rechargeable via an external power source. Some batteries can therefore be reused multiple times through recharging.

With some battery recharging scenarios, an electronic device can be operated during the charging process. For example, a user may charge a battery on a smartphone while using the mobile phone to make a phone call, watch a movie, play a game, or search the Internet. Performing these operations, however, may be limited to a particular physical range to an external power source. External power sources can include a power grid, which may be accessed via an electrical wall socket; a vehicle electrical system, which may be accessed via a Universal Serial Bus (USB) socket; and an external battery. These external power sources can be coupled to an electronic device via a power source adapter, such as a wall or travel adapter with a charging cord. Other examples of a power source adapter include a car charger, a power bank, and a wireless charging pad. These adapters likewise may be tethered to a wall socket or to a vehicle, may be embedded in the ground or another object, or may otherwise be relatively immobile. During these charging times, the portable electronic device effectively forfeits much of the portability of the device.

Accordingly, the inconvenience of charging an electronic device can be decreased by decreasing a frequency or an amount of time a portable electronic device undergoes a charging procedure. Electrical engineers and other designers of electronic devices therefore strive to decrease charging times for portable electronic devices and other battery-powered devices.

SUMMARY

Power systems can adaptively operate for increased efficiency, greater safety, and/or faster charging. In example implementations, a power system includes multiple chargers. A charging controller can selectively activate at least one charger of the multiple chargers to provide current to a power storage unit, such as a battery. The selection may be based on a charging type or other performance characteristic of a power source adapter that is coupled to an electronic device. In other example implementations, charger selection or utilization can be based on an advertised performance characteristic of a power source adapter or on an estimated performance characteristic, which can be obtained through testing the power source adapter. In additional example implementations, a charger, which may include a multi-output charging circuit with a capacitive divider array, can power multiple power domains of an electronic device. These multiple power domains can include lower and higher voltage power domains.

In an example aspect, an apparatus for adaptively providing power is disclosed. The apparatus includes a power adapter coupler, at least one transistor, a first charger, and a second charger. The first charger is coupled between the power adapter coupler and the at least one transistor. The second charger is coupled between the power adapter coupler and at least one transistor. The apparatus also includes a first switch, a second switch, and a charging controller. The first switch is coupled in series with the first charger between the power adapter coupler and the at least one transistor. The second switch is coupled in series with the second charger between the power adapter coupler and the at least one transistor. The charging controller is coupled to the first switch and the second switch. The charging controller is configured to selectively close the first switch to connect the first charger to the at least one transistor or close the second switch to connect the second charger to the at least one transistor.

In an example aspect, an apparatus for adaptively providing power is disclosed. The apparatus includes means for coupling to a power source adapter and means for storing power. The apparatus also includes first means for charging the means for storing power and second means for charging the means for storing power. The apparatus additionally includes first means for selectively connecting the first means for charging to the means for storing power and second means for selectively connecting the second means for charging to the means for storing power. The apparatus further includes means for controlling the first means for selectively connecting and the second means for selectively connecting based on a charging type of the power source adapter.

In an example aspect, a method for adaptively providing power is disclosed. The method includes charging a power storage unit using a first charger and disconnecting the first charger from the power storage unit. The method also includes determining a charging type of a power source adapter. The method additionally includes connecting a second charger to the power storage unit based on the charging type. The method further includes charging the power storage unit using the second charger.

In an example aspect, an apparatus for adaptively providing power is disclosed. The apparatus includes a power adapter coupler and a power storage unit. The apparatus also includes first circuitry corresponding to a first power domain and second circuitry corresponding to a second power domain. The apparatus further includes a multi-output charging circuit having an input, a first output, and a second output. The input is coupled to the power adapter coupler, the first output is coupled to the power storage unit and the first circuitry, and the second output is coupled to the second circuitry. The multi-output charging circuit includes a capacitor array coupled between the input and the first output.

BRIEF DESCRIPTION OF DRAWINGS

FIG. 2-1 illustrates an example scheme for matching a charging type of a power source adapter to circuitry or a charging mode of a power system of an electronic device.

FIG. 3-1 illustrates another example approach to selecting a charger to adapt to a charging type for charging a battery.

FIG. 3-2 illustrates an example approach to selecting a charger to adapt to a charging type with example evolutions of charging modes.

FIG. 3-3 illustrates an example approach to adapting to a single charging type with a passthrough charging mode.

FIG. 4-1 is a flow diagram illustrating an example technique for adapting a power system to a charging type or ability of a power source adapter.

FIG. 4-2 is a graph illustrating an example constant power environment relative to a voltage-current relationship.

FIG. 4-3 is a flow diagram illustrating an example technique for adapting a power system to a performance characteristic of a power source adapter.

FIG. 5-1 illustrates an example architecture with a multi-output charging circuit and two or more voltage rails.

FIG. 5-2 illustrates an example system architecture including a dual-output switch capacitor.

FIG. 5-3 illustrates an example architecture for the dual-output switch capacitor of FIG. 5-2.

FIG. 5-4 illustrates an example system architecture including a switch capacitor in conjunction with a step-down regulator.

FIG. 5-5 illustrates an example architecture for the switch capacitor in conjunction with the step-down regulator of FIG. 5-4.

DETAILED DESCRIPTION

Figure 1:
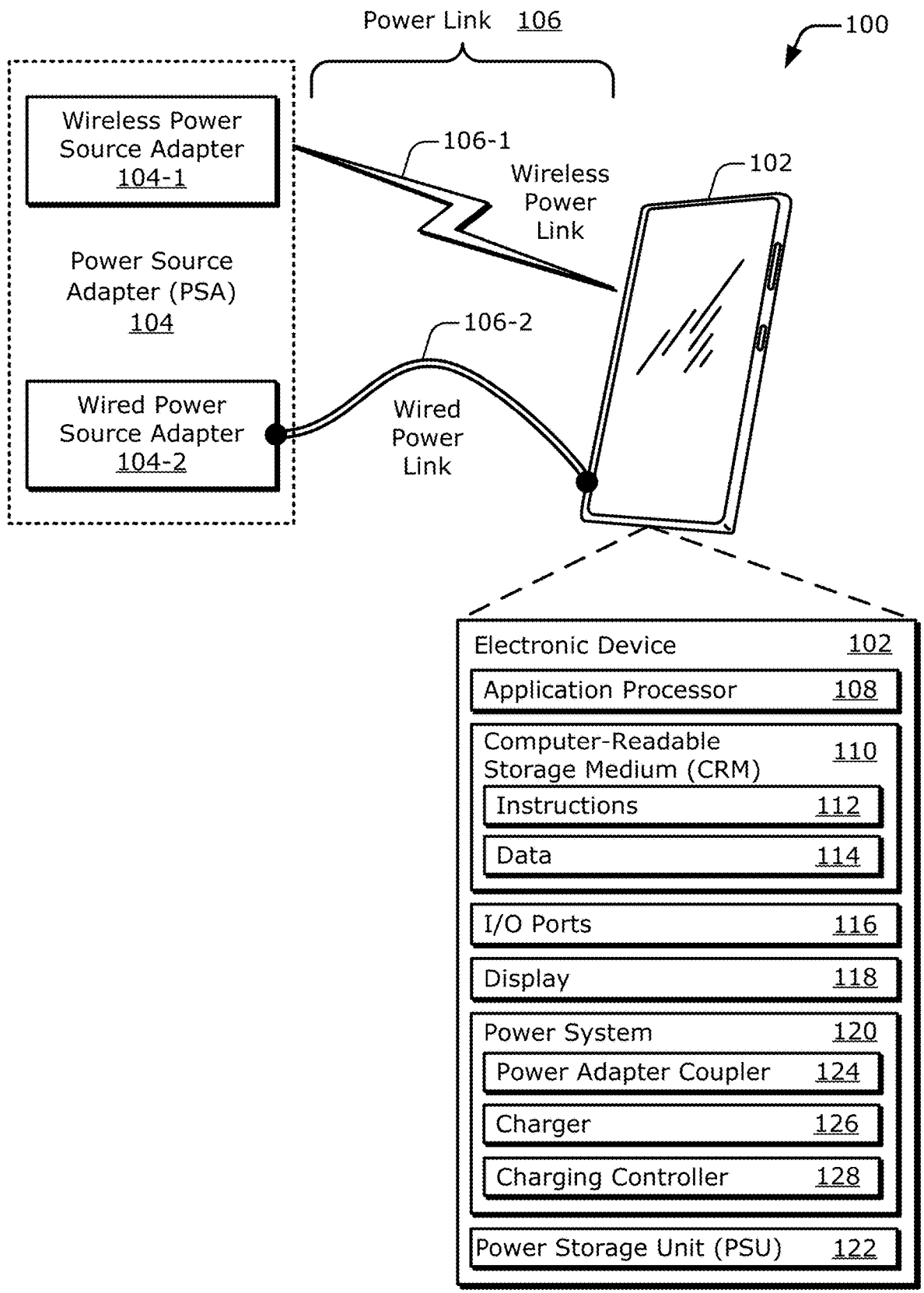
FIG. 1 illustrates an environment depicting an example electronic device having a power system that can implement adaptive powering schemes and procedures.

As the sizes of the housings of many portable electronic devices have become smaller to facilitate portability, some of the internal components have grown larger. For example, printed circuit boards (PCBs) have become larger or more complicated to enable more features to be included, such as being compatible with additional wireless standards. Further, manufacturers are making many devices thinner and thinner for style or convenience. These various factors can result in less space for the battery within the housing.

Batteries with smaller volumes may have a reduced total charge capacity. Fortunately, improvements in battery materials and technologies enable electronic device makers to install batteries that can handle higher current rates and can thus charge faster. These faster-charging batteries can mitigate some of the effects of having a smaller total charge capacity. Such effects are mitigated because faster charging can provide greater additional battery life in shorter periods of time while charging is available.

Thus, providing useful or convenient battery life can depend partially on faster or more-efficient charging capabilities, at least with electronic devices having smaller batteries relative to the power draw by the associated device. Providing faster or more-efficient charging capabilities is difficult for several reasons. First, routing power to the battery for faster charging can be appreciably limited by power dissipation, and the corresponding temperature rise, in dense or crowded electronic designs.

Second, a user cannot always select the most appropriate power source adapter for the best possible charging. For instance, consumers would ideally select a power source adapter that either provides higher power or more "efficient" end-to-end power or would select a power source adapter that offers a good balance between the two. A consumer, however, may not be able to keep an "ideal" power source adapter at hand as the consumer carries the portable electronic device around during the day. Moreover, many power source adapters produced today may not provide either higher power or higher end-to-end power efficiency, and the ones that do are not easily recognizable by most consumers.

Third, in some cases certain device components, such as processors, are operating in a "low" voltage power domain while the battery in multicell battery systems operates with "high" voltage power domains. This introduces additional voltage conversion stages, which leads to reduced usable battery life. In other words, some portable devices do not utilize "optimized" power grids, which may include multiple voltage rails for multiple power domains within a device. This omission can cause such portable devices to fail to maximize usable battery life.

Fourth, some in-device charging implementations assume compliancy with a charging standard, such as Universal Serial Bus® (USB) Power Delivery (PD) or Qualcomm® Quick Charge™ 3/3+/4/5 specifications. Power specifications may involve, for example, a constant current (CC) mode for easier power control, the correct advertisement of charging adapter power or voltage capabilities, and so forth. Many power banks and other power accessories on the market, however, do not support the constant current mode and/or do not accurately inform a device to be charged about the accessory's actual or true capabilities. This can result in suboptimum charging scenarios in which charging occurs more slowly than necessary or additional heat is generated.

More importantly, this can introduce safety issues for the battery or the charging system of the device if the lack of compliancy is not properly detected or if the device fails to adapt its operating mode based on such detection.

Generally, to decrease a length of time that transpires to charge a battery of an electronic device, a rate of charging can be increased. In other words, charging can occur faster as more charge or a higher current is provided to the battery in a given period of time. This increased rate of charging can be attained by raising a magnitude of a current being applied to the battery, assuming the battery can accept a higher current. For instance, for a specific period or phase of charging, the charging time can be halved by doubling an amperage of a current being applied to the battery. Increasing current amperage, unfortunately, can create thermal issues as power dissipation occurs due to the battery charging.

Power dissipation generates heat, and the heat can extend throughout various charging components that may be distributed across a power source adapter, a power system of the electronic device, and a battery of the device. The heat generation wastes power, can damage parts of the electronic device, and may reduce actual power used due to thermal mitigation activities undertaken inside the portable device. Uncontrolled heat generation can even risk a fire developing due to the battery. These and other concerns related to charging batteries and powering devices are further described next.

Battery-powered electronic devices are charged by connecting them wirelessly or via a wire to a power source via a power source adapter. Some power source adapters are designed to provide higher current and/or voltage levels to accelerate the charging of the battery. As power source adapters evolve over time, they may change functionality and can adjust charging parameters to deliver the higher current and/or the higher voltage. A first concern with powering an electronic device arises because, due to adapter evolution, many different types of power source adapters enter the market and are available for charging an electronic device. A given electronic device may therefore be unable to operate optimally with a power source adapter that a user connects to the device. Unfortunately, this may lead to an inefficient charging procedure for the electronic device that slows charging, wastes power, or risks damaging the electronic device or the battery thereof. Further, including too many different chargers within a given device to accommodate so many different power source adapter evolutions is prohibitive in terms of space and cost. Each charger adds cost to the electronic device and occupies space within a housing of the device, which increasingly has less volume due to the factors set forth above.

A second concern with powering electronic devices arises because communication between a power source adapter and the connected electronic device may be inaccurate. For example, a power source adapter may advertise a capability that it is fully or partially unable to provide. In some cases, a power source adapter indicates that it possesses a particular capability but is unable to provide the capability at all. In other cases, a power source adapter can provide the particular capability, but the power source adapter fails to provide the capability to an expected (e.g., advertised or standards-specified) performance level. The electronic device may rely on this advertised capability to control the charging procedure. If the power source adapter does not provide an expected capability, the electronic device or its battery is at risk of being damaged. The charging process may also be inefficient; this inefficiency may be in terms of charging slowly or failing to store the power that is supplied.

A third concern with powering electronic devices arises because there is an increasingly frequent mismatch between relatively lower-voltage power domains and newer batteries. Many newer batteries are realized as multicell battery arrangements that produce a relatively higher voltage level. Multicell batteries, which can have two or more cells that are coupled together in series, may also be referred to as stacked cell batteries. Such stacked or multi-cell batteries may produce a relatively higher voltage as compared to single-cell batteries. Although multicell batteries can provide some benefits, they may also result in additional voltage conversion stages. Unfortunately, each additional voltage conversion stage lowers the usable battery life of the battery.

To at least partially address these concerns, this document discloses several example approaches to adaptively powering an electronic device, some of which include charging a battery thereof. In a first example approach for efficiently charging batteries, including multicell batteries, an electronic device selects the appropriate charger or charging implementation depending on a power source type or capability of a connected power source adapter. In a second example approach, an electronic device detects a power source adapter's behavior or compliancy with industry specifications and adjusts device charging operations accordingly. In a third example approach, an electronic device enables efficient operation that supports both high-voltage domains (e.g., of a battery, a display screen, or a power amplifier) and low-voltage domains (e.g., memories and processors) in environments that include various types of batteries, including multicell applications.

In example implementations, an apparatus can flexibly adapt to the capabilities of a power source adapter to which the apparatus is connected. Generally, an apparatus can obtain, in some cases, at least one input parameter or at least one performance characteristic associated with the power source adapter that is connected wirelessly or by wire. The apparatus can determine one or more charging capabilities of the connected power source adapter responsive to the at least one input parameter or the at least one performance characteristic. Based on the determined charging capabilities, the apparatus selectively activates circuitry to engage an efficient and safe charging procedure.

In first example implementations, an apparatus includes multiple chargers, which can be separate or at least partially integrated together, and selectively employs a charger that corresponds to the connected power source adapter to power the apparatus and charge a power storage unit thereof, such as a multicell battery included therein. For example, the apparatus can include a first charger corresponding to a first evolution of a power source adapter and a second charger corresponding to a second evolution of a power source adapter. For instance, an electronic device can include a low-cost, efficient dual-charger implementation in which the dual chargers are coupled to a multicell battery. Charger examples include buck-boost, bypass, and capacitive-divider-based multi-output charging architectures. In operation, the apparatus selectively employs the charger corresponding to the evolutionary level of the connected power source adapter, which can be based on a determined performance characteristic that is obtained via advertising or detecting/estimating. In these manners, the apparatus can adaptively engage in efficient and safe charging.

In second example implementations, an apparatus can determine the capabilities of a connected power source adapter. Some power source adapters can advertise or broadcast a charging ability or capability. The apparatus can perform at least one test to verify if the connected power source adapter can provide an advertised charging capability. For instance, the apparatus can detect if the connected power source adapter can maintain a given current within some range. It can be dangerous if the power source adapter is unable to maintain a requested current level within a tolerated range if the apparatus or a charger thereof is expecting the current level to be maintained. If the adapter can maintain a requested current level, the apparatus permits charging in accordance with the advertised charging capability.

On the other hand, if the power source adapter cannot maintain a requested current level, the apparatus switches to permit charging in accordance with another charging capability (e.g., the apparatus may step back to a less efficient charging mode). Example charging abilities include current-controlled, voltage-controlled, temperature-controlled, and power-controlled charging procedures. The apparatus may also monitor charging and compensate if the connected power source adapter can implement a particular charging mode but fails to remain within certain specified operational parameters. Further, the apparatus can detect charging capabilities in the absence of advertised capabilities. In these manners, the apparatus can selectively utilize a more efficient (including potentially a most efficient) charging mode that a power source adapter can effectively provide while reducing safety and performance concerns arising from trusting a power source adapter that may fail to provide an advertised capability.

In third example implementations, an apparatus includes a switch capacitor circuit that can be connected to a power source adapter, including in an environment in which a power storage unit of the apparatus comprises a battery having multiple cells. The apparatus can also include multiple power domains with different voltage levels, such as a relatively lower-voltage power domain and a relatively higher-voltage power domain. In some cases, the multicell battery can be coupled to the higher-voltage power domain. To power the lower-voltage power domain, the switch capacitor circuit reduces the voltage from the higher voltage to the lower voltage.

In certain environments, the switch capacitor circuit can include dual outputs using at least one capacitor voltage divider—e.g., a first output for the multicell battery and the higher-voltage power domain and a second output for the processor/memory circuitry and the lower-voltage power domain. Although some implementations are described or depicted in terms of two power domains with two different voltage levels and two outputs for the switch capacitor circuit, other implementations can include three or more of any of these entities. For instance, an implementation may include six power domains distributed across three different voltage levels (e.g., high, medium, and low) that are each coupled to one of three outputs of a switch capacitor circuit. Further, a battery may be implemented as a single-cell battery, and multicell batteries can contain two, three, or more cells.

In some cases, a dual-output switch capacitor circuit or other multi-output charging circuit may implement a voltage divide-by-two or a voltage divide-by-four functionality (or both with two capacitive voltage dividers) to facilitate serving the multiple voltage levels of the multiple power domains. In other cases, the switch capacitor circuit can include a step-down voltage regulator in addition to a capacitive voltage divider. The capacitor voltage divider may implement a voltage divide-by-two functionality for the higher-voltage power domain. The step-down voltage regulator can further reduce the voltage for the lower-voltage power domain during charging or while drawing power from the battery. In these manners, the switch capacitor circuit can increase efficiency for system powering—including battery charging—and decrease charging time. Such switch capacitor circuits can also enable utilization of simpler multicell battery packs to reduce costs.

FIG. 1 illustrates an example environment 100 depicting an electronic device 102 having a power system 120 implementing an adaptive powering or charging scheme. In the environment 100, the example electronic device 102 can be powered or charged via a power link 106 from a power source adapter 104 (PSA 104). In FIG. 1, the electronic device 102 is depicted as a smartphone. However, the electronic device 102 may be implemented as any suitable computing or other electronic device, such as any electronic device that can be powered from at least one power storage unit 122 (PSU 122).

Using the power storage unit 122, these devices can be designed to be at least temporarily separated from a grid connection, such as portable electronic devices, or can be intended to handle situations without grid power, such as during power failures. Examples of such electronic devices include a cellular base station, broadband router, access point, cellular or mobile phone, gaming device, navigation device, media device, laptop or notebook computer, desktop computer, tablet computer, server computer, network-attached storage (NAS) device, smart appliance, vehicle-based power or charging system (e.g., drones and passenger vehicles), and robots. Other examples of such electronic devices include an Internet of Things (IoT) device, sensor or security device, asset tracker, fitness management device, wearable device such as intelligent glasses or smart watch, wireless power device (transmitter or receiver), medical device, battery-backup system or device containing a battery-backup system, battery storage system (e.g., a residential or industrial device to store power from a non-constant power source such as wind or solar), an electric or hybrid vehicle, and so forth.

Examples of a power source adapter 104 include a wireless power source adapter 104-1 and a wired power source adapter 104-2. However, a power source adapter 104 can be realized in a different manner. The electronic device 102 can receive power from the power source adapter 104 via the power link 106, which may be implemented as any suitable type of link that can provide power. For instance, the electronic device 102 can be coupled to the wireless power source adapter 104-1 (e.g., an apparatus with a transmitter coil that is connected to the electrical grid or a vehicle's electrical system) to receive power via a wireless power link 106-1 (e.g., an electromagnetic signal). Alternatively or additionally, the electronic device 102 can be coupled to a wired power source adapter 104-2 (e.g., an apparatus with a transformer that is connected to the grid, a photovoltaic array, or a separate/external battery) to receive power via a wired power link 106-2 (e.g., a cable, cord, or wire carrying an electrical or galvanic signal). Thus, a wireless or wired power source adapter 104-1 or 104-2 may include a power source (e.g., a battery) or may be coupled to a power source (e.g., a wall socket). Further, at least a portion of a wired power source adapter 104-2 may be coupled between a wireless power source adapter 104-1 and a power source.

These power links 106 can be configured in accordance with a proprietary protocol or a standardized protocol, such as a Wireless Power Consortium (Qi) protocol for the wireless power link 106-1 or a Universal Serial Bus (USB)

standard or a QUICK CHARGE™ protocol for the wired power link 106-2. Each power link 106 may also provide a communication channel along with a power conduit. Generally, the power link 106 extends from the power source adapter 104 to the electronic device 102 to provide power, via the power system 120, to the power storage unit 122 (PSU 122) or to other circuitry of the device for contemporaneous usage (including to both the power storage and the consuming circuitry). Such powering and examples of these components are described below.

As shown, the electronic device 102 includes at least one application processor 108 and at least one computer-readable storage medium 110 (CRM 110). The application processor 108 may include any type of processor, such as a central processing unit (CPU) or a multi-core processor, that is configured to execute processor-executable instructions (e.g., code) stored by the CRM 110. The CRM 110 may include any suitable type of data storage media, such as volatile memory (e.g., random-access memory (RAM)), non-volatile memory (e.g., Flash memory), optical media, magnetic media (e.g., disk or tape), and so forth. In the context of this disclosure, the CRM 110 is implemented to store instructions 112, data 114, and other information of the electronic device 102, and thus the CRM 110 does not include transitory propagating signals or carrier waves.

The electronic device 102 may also include one or more input/output ports 116 (I/O ports 116) or at least one display 118. The I/O ports 116 enable data exchanges or interaction with other devices, networks, or users. The I/O ports 116 may include serial ports (e.g., universal serial bus (USB) ports), parallel ports, audio ports, infrared (IR) ports, camera or other sensor ports, and so forth. The display 118 can be realized as a display screen or a projection that presents one or more graphical images provided by the electronic device 102, such as a user interface associated with an operating system, program, or application. Alternatively or additionally, the display 118 may be implemented as a display port or virtual interface through which graphical content of the electronic device 102 is communicated or presented.

Although not explicitly shown, the electronic device 102 can further include at least one wireless interface device and at least one antenna, which are coupled one to another. The wireless interface device provides connectivity to respective networks and peer devices via a wireless communication link, which may include the wireless power link 106-1. Alternatively or additionally, the electronic device 102 may include a wired interface device for communicating with another electronic device via a wired communication link, which may include the wired power link 106-2. A wireless interface device may include at least one communication processor (e.g., a modem or signal processor), at least one transceiver, or at least one radio-frequency (RF) front-end that are coupled together to provide wireless communications. The transceiver or RF front-end may include a power amplifier that draws more power than some other circuit components. These wireless communications can include those exchanged between the electronic device 102 and the power source adapter 104 and can be propagated in-band with a power link 106 or out-of-band using a communication link that is not providing power.

In example implementations, the power system 120 is operatively coupled to (and/or can include) the power storage unit 122. In operation, the power system 120 can charge, or add power to, the power storage unit 122. The power system 120 can also be operatively coupled to other components, such as to an application or modem processor or to a power amplifier. Thus, the power system 120 can also or instead provide power directly to operational components of the electronic device 102, such as the application processor 108, the display 118, or part of the wireless interface device. Examples of the power storage unit 122 include a battery, a capacitor (e.g., a supercapacitor), combinations thereof, and so forth. A battery may be composed of at least one rechargeable material, such as lithium, lithium-ion, nickel-metal hydride, lead-acid, lithium-ion polymer, lithium iron phosphate, other types of lithium, and so forth. The power storage unit 122 may include a single cell or multiple cells (e.g., two or more cells in series or parallel configuration). As illustrated, the power system 120 includes at least one power adapter coupler 124 (PAC 124), at least one charger 126 (e.g., one, two, or more chargers), and at least one charging controller 128. Although not shown in FIG. 1, the power system 120 can also include one or more voltage regulators that convert battery voltage/power to the voltage/power specified for input to one or more power-consuming components (e.g., processor, display, or power amplifier).

During charging opportunities, the power adapter coupler 124 can be coupled to the power source adapter 104 via the power link 106. At least one charger 126 may be coupled to (e.g., between) at least the power adapter coupler 124 and the power storage unit 122. The at least one charger 126 can therefore accept power from the power source adapter 104 and provide the power to the power storage unit 122 or deliver power directly to an operational power domain, such as one with a transceiver or modem (not shown). The charging controller 128 is operatively coupled at least to the charger 126, and/or one or more switches that are associated therewith, to control charging and other power-related operations. Example implementations of a power system 120, including aspects of the charger 126 and the charging controller 128, are described below, starting with FIG. 2.

In some cases, the application processor 108, a modem, and/or the charging controller 128 can be combined into one module or integrated circuit (IC), such as a system-on-chip (SoC). Additionally or alternatively, the charging controller 128 may be realized separately (e.g., as a stand-alone chip) or may be incorporated into a wireless interface device, such as a communication processor (e.g., modem) or a transceiver thereof. Further, the charging controller 128 may also or instead be incorporated with a power management integrated circuit (PMIC). Additionally, the charging controller 128 may include a memory (not separately shown), such as a separate CRM 110, to store data and processor-executable instructions (e.g., code). Alternatively, the charging controller 128 can include a portion of the CRM 110 of the application processor 108 or can access this CRM 110 to obtain computer-readable instructions (e.g., instructions 112) or data 114.

The charging controller 128 can be implemented as part of, or separate from, other components of the power system 120. Further, the charging controller 128 can be implemented as a general-purpose processor, specific-purpose processor, fixed logic circuitry, hard-coded logic, some combination thereof, and so forth. Components of the charging controller 128 can be localized at one module (e.g., a packaged integrated circuit chip) or one printed circuit board or can be distributed across multiple modules or boards of the electronic device 102. Generally, the charging controller 128 at least partially controls the power system 120 and enables charging of the power storage unit 122 and other powering operations to be performed.

The various components illustrated in FIG. 1 using separate schematic blocks may be manufactured or packaged in different discrete manners. For example, one physical board, module, or chip may include components of the power adapter coupler 124 and components of the charger 126, and another physical board may include the charging controller 128. Alternatively, one board, module, or chip may combine the charging controller 128 with at least one charger 126 while another charger 126 is disposed on one or more other boards, modules, or chips. Further, the components illustrated in the various figures may be integrated on a single IC chip or distributed across multiple IC chips, which are packaged together or separately.

Figure 2:
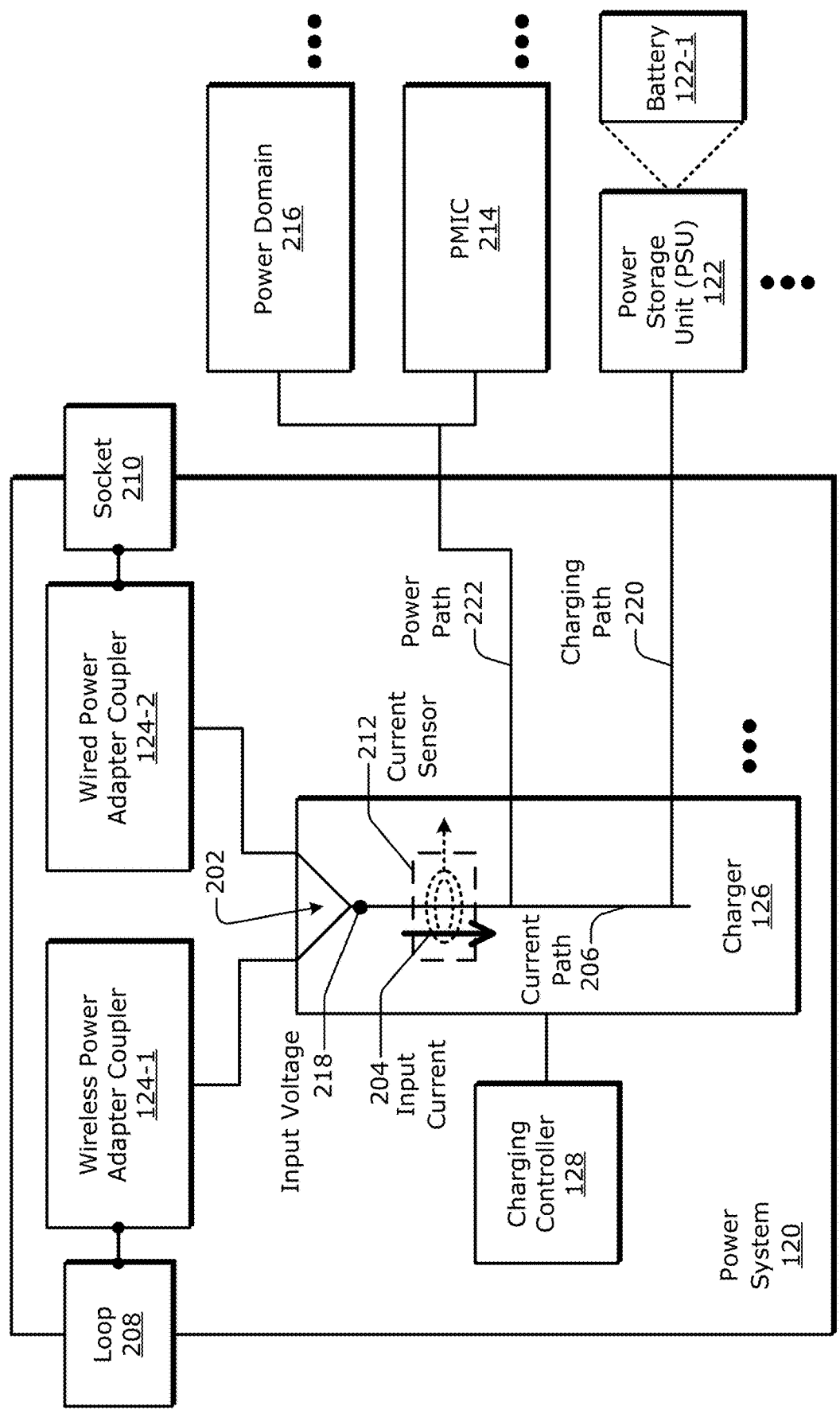
FIG. 2 illustrates an example power system including at least one charger and a charging controller and depicts multiple entities that receive power via the power system.
Figures 1, 2:
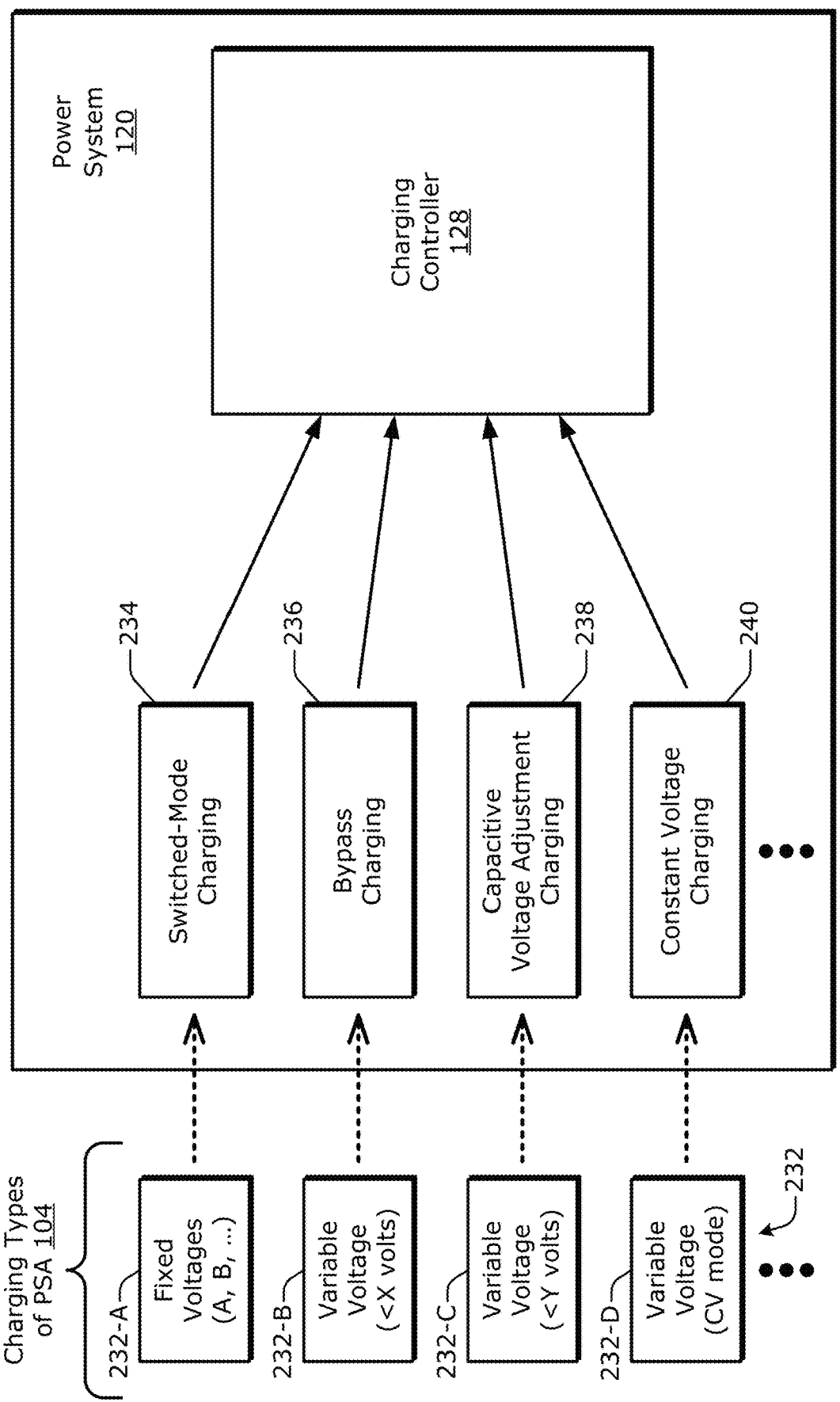

FIG. 2 illustrates, generally at 200, an example power system 120 including at least one charger 126 and at least one charging controller 128. FIG. 2 also illustrates multiple entities that are powered through the power system 120. Although not explicitly shown in FIG. 2 for clarity, the power system 120 can include multiple ones of any depicted components, such as multiple chargers 126 or multiple power domains 216. Here, the power system 120 can include two power adapter couplers 124: a wireless power adapter coupler 124-1 and a wired power adapter coupler 124-2.

The wireless power adapter coupler 124-1 includes or is coupled to a loop 208 (e.g., an inductive loop or coil) to electromagnetically or wirelessly interface with the wireless power source adapter 104-1 via the wireless power link 106-1 (both of FIG. 1). The wired power adapter coupler 124-2 includes or is coupled to a socket 210 (e.g., that comports with a USB specification, a power-transfer-only specification, or a proprietary specification that enables power transfer with or without inband communications) to interface with the wired power source adapter 104-2 via the wired power link 106-2 (both of FIG. 1). The socket 210 may accept a plug of a charging cable. However, the power system 120 can include more, fewer, or different power adapter coupler(s).

In example implementations, the power system 120 can include multiple chargers 126, at least two of which may be coupled together in parallel with each another. The charger 126 includes at least one current path 206. The wireless power adapter coupler 124-1 and the wired power adapter coupler 124-2 can be coupled to the current path 206 of the charger 126 via one or more switches 202 (not explicitly shown in FIG. 2). At least one selected power adapter coupler 124 provides an input current 204 on the current path 206 or an input voltage 218 (including both in some cases). A current sensor 212 can determine (e.g., sense) the input current 204. A current sensor can be realized using, for instance, a current mirror. The current mirror can be scaled such that a mirrored current has a lower magnitude than the sensed current. A current scaling can reach, e.g., 1000s of times or more (e.g., several orders of magnitude) to reduce a power utilization that results from implementing a current mirror.

As shown, the charger 126 can be coupled to at least one power management integrated circuit 214 (PMIC 214) via a power path 222. Additionally or alternatively, a charger 126 can be incorporated as part of a PMIC 214 (e.g., to realize a charging or interface PMIC 214). Each PMIC 214 can regulate a voltage level for some set of circuitry (not shown), such as a whole IC chip or core, a power domain, or another portion of an IC chip. Thus, the PMIC 214 may control a power or voltage of the power domain 216, or the PMIC 214 may control another power domain (not shown).

Each PMIC 214 can be coupled to the current path 206 of the charger 126. The current path 206 of the charger 126 can also be coupled to at least one power domain 216 via the power path 222. The circuitry of any given power domain 216 can be provided power or caused to experience a power collapse together. In some cases, different power domains 216 may be provided different voltage levels, such as a relatively lower voltage and a relatively higher voltage or such as low, medium, and high voltage levels. In operation, "excess" current that is not contemporaneously consumed by a PMIC 214 or a power domain 216 is routed to a charging path 220 for the power storage unit 122. As shown, the power storage unit 122 can be realized as at least one battery 122-1, which may include one or more battery cells (in a series or parallel configuration).

The charging controller 128 can be coupled at least to the charger 126 or one or more switches that are included therein or associated therewith. The charging controller 128 and charger 126 can also be combined or integrated together. The charging controller 128 manages, regulates, monitors, starts/stops, or otherwise controls a charging procedure or a powering process, as is described herein. In example operations, the charging controller 128 can obtain at least a representation of the input current 204 and/or the input voltage 218. The charging controller 128 can therefore control charging parameters or operations based on the input current 204 and/or the input voltage 218 (including based on both). The charging controller 128 can also control charging parameters or operations based on a current supplied to the battery, battery voltage, battery temperature, other temperatures, and other signals, such as those indicative of power draw requests of one or more power domains. Additionally or alternatively, the charging controller 128 can select a charger circuit of the charger 126 or select between two or more chargers based on a power source type or capability of the power source adapter 104 (of FIG. 1). Examples of this selection are described below with reference to FIG. 3 et. seq.

The charging controller 128 can also or instead determine a charging capability of a connected power source adapter 104 and engage the charger 126 to operate in a corresponding charging mode. Examples of this detection and engagement are described below with reference to FIG. 4 et. seq. Additionally or alternatively, the charging controller 128 can control a switch capacitor that is coupled to one or more power domains 216 or the power storage unit 122, including both in some cases. A dual output scheme with multiple switched capacitors (e.g., realized as a capacitive divider to reduce a voltage or as a capacitive multiplier to increase a voltage) or with a switched capacitor and a step-down voltage regulator or a step-up voltage regulator (e.g., to decrease or increase voltages respectively) can convert an input or other voltage to an output voltage. The output voltage can be provided to a lower-voltage power domain 216, a higher-voltage power domain 216, or the battery 122-1. Examples of this adaptability are described below with reference to FIG. 5 et. seq. Although certain ones of the various example approaches to adaptive powering are illustrated and described separately, two or more of such approaches may be implemented together. For example, the charger circuitry selection of FIG. 3 et. seq. and the mode selection of FIG. 4 et. seq. may be implemented by a single electronic device. Additionally, the mode selection schemes of FIG. 4 et. seq. may be implemented together with the switch capacitor architectures of FIG. 5 et. seq. Further, the charger circuitry selection of FIG. 3 et seq. may entail selecting to use or to not use a switch capacitor charger as described with reference to FIG. 5 et. seq.

FIG. 2-1 illustrates an example scheme 200-1 for matching a charging type of a power source adapter 104 to circuitry or a charging mode of an electronic device 102. Examples of power source adapters 104 include travel adapters, wall adapters, car chargers, power banks, power or USB hubs, car/plane charging ports, wireless charging mats/pads/stands, computer or other device port, and so forth. As shown, a power source adapter 104 (e.g., also of FIG. 1) can operate in accordance with any of many possible charging types 232. Example charging types 232 include a fixed-voltage charging type 232-A (e.g., 5V or 9V), a variable-voltage charging type 232-B up to one or a first voltage maximum (e.g., 10V maximum), another variable-voltage charging type 232-C up to another or second voltage maximum (e.g., 20V maximum), a variable-voltage charging type 232-D with a control capability (e.g., a voltage-controlled ability (constant voltage (CV) mode) or a constant-voltage (CV) charging type), and so forth.

In response to one or more aspects of the power source adapter 104, the charging controller 128 may be capable of adapting operation of the power system 120 to at least one charging type of two or more charging types. In different scenarios, the charging controller 128 can select a charger circuit, can verify a given capability of the power source adapter 104 or engage a charging mode based on an adapter capability, can utilize a switch capacitor to adjust a charging voltage level, combinations thereof, and so forth. In FIG. 2-1, the power system 120 indicates multiple charging circuits that can be engaged responsive to a corresponding charging type. For example, the charging controller 128 can engage at 234 a switched-mode charger or buck-boost charging circuit to convert a fixed voltage (e.g., from a fixed-voltage charging type 232-A of a PSA 104), such as a fixed input voltage, to a target battery voltage. Generally, a switch-mode charger can include a buck charger, a boost charger, a buck-boost charger, and so forth.

As another example, the charging controller 128 engages at 236 a bypass, direct, or pass-through charger to convert a variable, but relatively lower, voltage (e.g., from a variable-voltage charging type 232-B of a PSA 104) to a target battery voltage. Further, the charging controller 128 can engage at 238 a capacitive voltage adjustment charger to convert a variable, but relatively higher, voltage (e.g., from a variable-voltage charging type 232-B of a PSA 104) to the target battery voltage using a capacitive divider or a relatively lower voltage to the target battery voltage using a capacitive multiplier (e.g., charge pump). Additionally, as indicated at 240, a voltage-controlled mode of a variable-voltage adapter (e.g., from a variable-voltage, but constant-voltage (CV) mode, charging type 232-D of a PSA 104) can complicate charging at the electronic device because current regulation becomes more difficult. The charging controller 128 can, however, engage constant-voltage charging at 240 to ensure the CV mode operates safely and efficiently. Example circuits that are described below can facilitate a voltage level conversion while employing, for instance, a capacitive divider circuit.

In some implementations, the variable-voltage charging types 232-B and 232-C can have different maximum voltage levels. For example, a first variable-voltage charging type can provide a first maximum voltage level, and a second variable-voltage charging type can provide a second maximum voltage level. Here, the first maximum voltage level is different from the second maximum voltage level. Although four different charger or charging approaches 234-240 are shown in FIG. 2-1 and described above, it may be impractical for some electronic devices to include an abundance of charging circuitries due to cost or size constraints. Accordingly, some described implementations enable power adaptability using two different chargers or charging approaches. On the other hand, more than two—including more than four—different charger types or charger circuits may be included in a given electronic device 102.

Generally, the charging controller 128 adapts to the power source adapter type or capability by selecting a charging circuit or adjusting an operational mode of the power system 120 based on the power source adapter 104. Thus, the charging controller 128 can enhance charging performance by tuning for different adapter characteristics. Depending on device load, other device conditions, and adapter charging capabilities, the charging controller 128 can adaptively control a powering path, such as a current path 206, a charging path 220, or a power path 222 (of FIG. 2) using, for example, one or more switches. In a bypass mode at 236, the power dissipation (Pdiss) of the PMIC/charger may be lower. The total Pdiss for the electronic device, however, may be greater in the bypass mode due to power dissipation in other components of the device, such as the PCB, flex cables, and so forth. The flexibility to switch between chargers depending on operating, environmental, and other conditions enables superior charging efficiency (e.g., a reduced skin temperature), lower Pdiss loss, decreased charging time, and so forth.

Multiple example implementations are described herein. First, a hardware-based implementation enables superior charger/charging selection that depends on the type of power source adapter connected to the electronic device. In some cases, the hardware supports at least buck-boost charging architectures and bypass charging architectures. Second, a process-based implementation enables the electronic device to transition between a current control mode (e.g., a constant current mode) and a voltage control mode (e.g., a constant voltage mode) or between a buck-boost mode and a bypass charging mode, or both. Third, another process-based implementation can detect an actual charging type or capability of a power source adapter, even if the adapter advertises an incorrect capability or is silent as to one or more capabilities. Fourth, another hardware-based implementation enables a voltage conversion component and/or a current conversion component to be utilized in a way that can satisfy a low-voltage power domain and a high-voltage power domain in a multicell battery system environment. The demands of power domains with different voltage levels can be met without necessarily relying on more-complicated multicell batteries—e.g., such as those with a center tap.

Different variable-voltage power source adapters that comport with different specifications are available in the marketplace. Examples of variable-voltage power source adapters, or corresponding supported specifications, include Universal Serial Bus (USB) PD PPS, Quick Charge 4 (QC4), QC3+, and so forth. As different power source adapters become increasingly more prevalent in the marketplace, it is advantageous to be able to transition between different constant-parameter modes (e.g., CV and CC modes) and also between switching and bypass charging modes, including but not limited to those environments with multicell battery arrangements. Furthermore, detecting other capabilities of the power source adapter, which may not be advertised correctly or may not be advertised at all, allows the power (e.g., charging) implementation to consider or take actual adapter capabilities into account and to enhance (e.g., optimize or at least increase) efficiency and safety. Examples include a real power profile (e.g., voltage and/or current), a constant power profile, and so forth.

Figure 3:
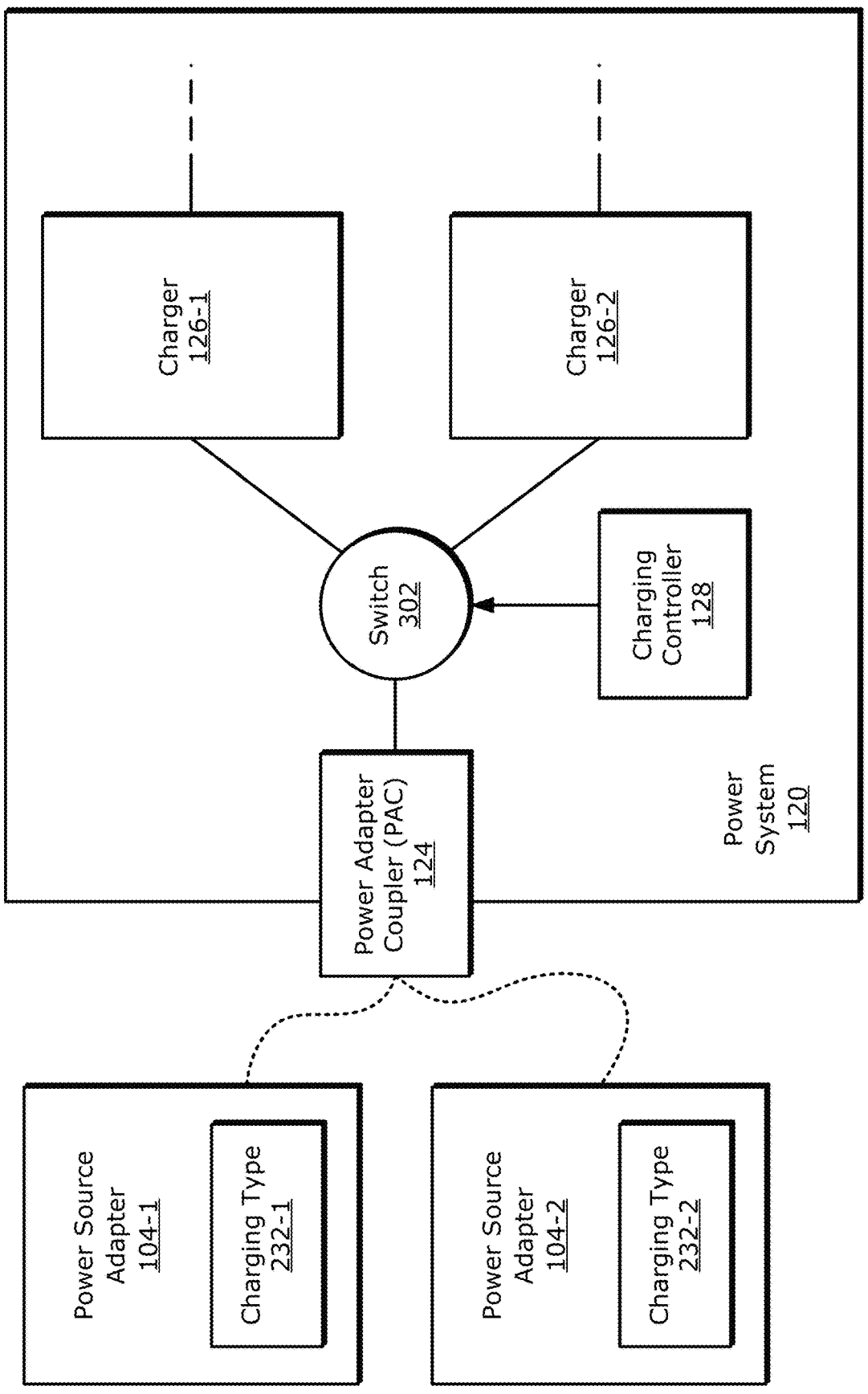
FIG. 3 illustrates an example approach to selecting a charger of an electronic device to adapt to a charging type of a power source adapter.
Figures 1, 3:
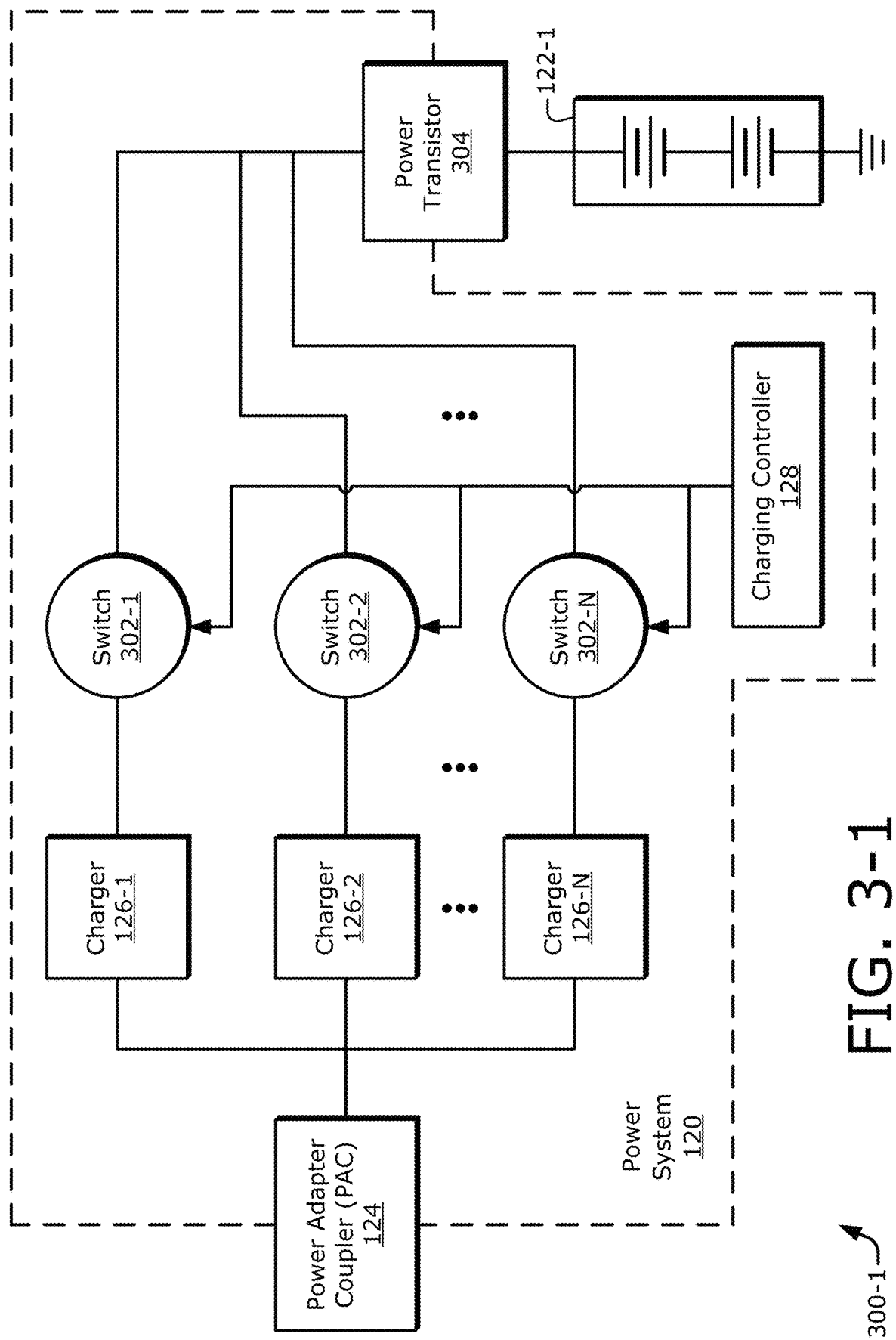
Figures 2, 3:
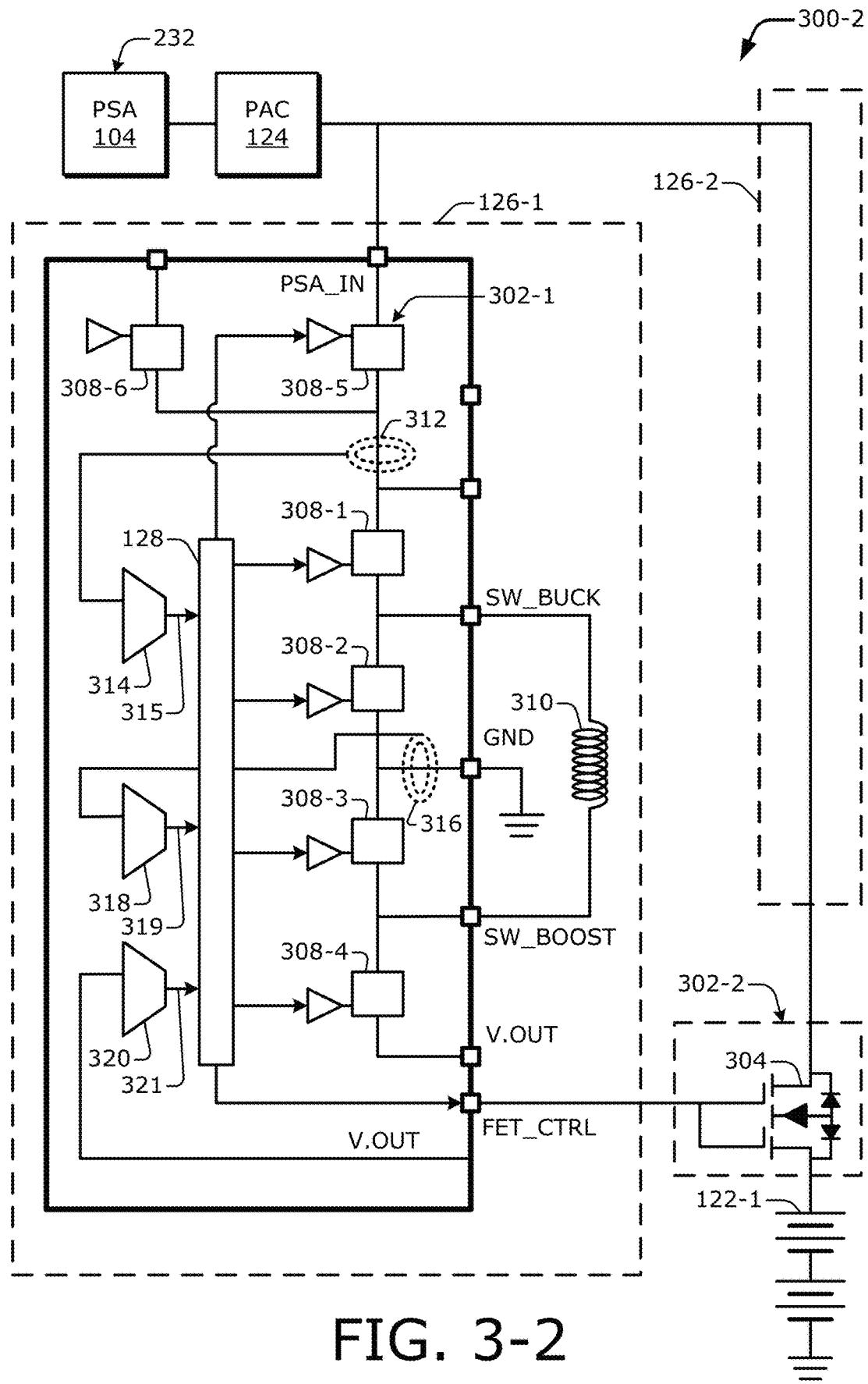
Figure 3:
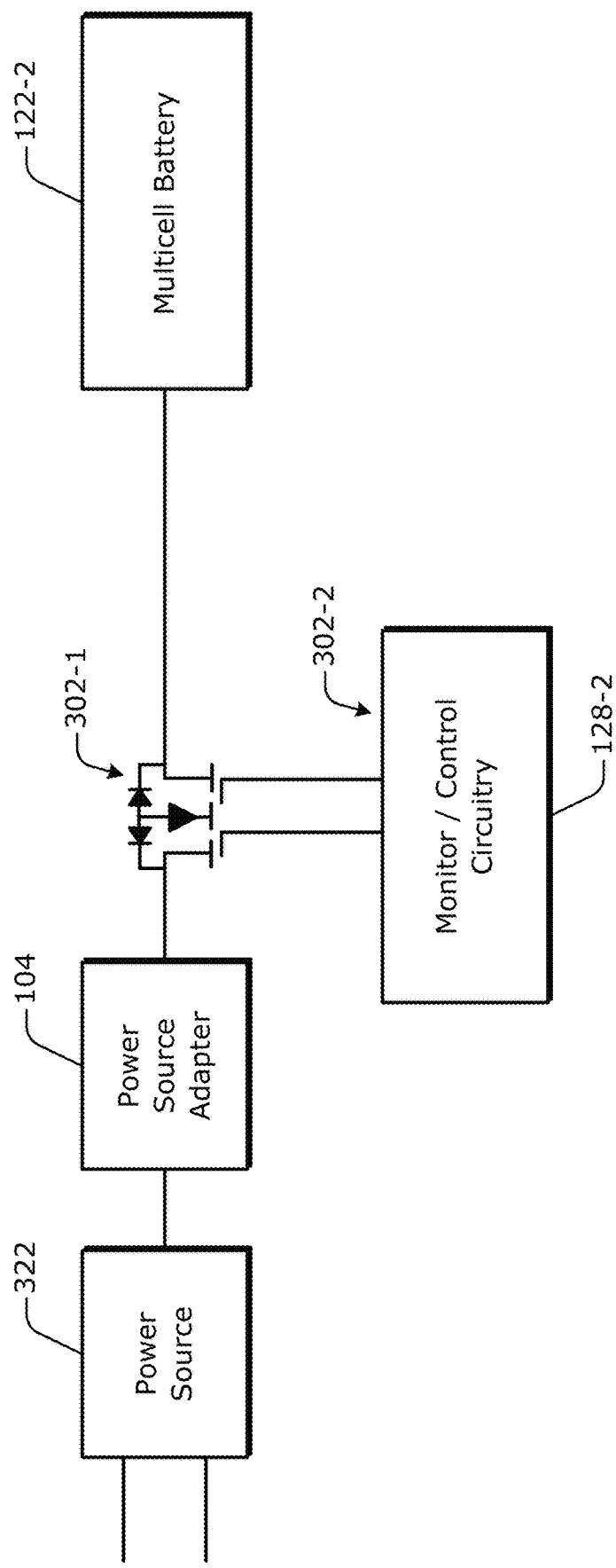

FIG. 3 illustrates an example approach 300 to selecting a charger 126 to adapt to a charging type 232 of a power source adapter 104. As shown, two power source adapters 104-1 and 104-2 have two different charging types 232-1 and 232-2. A power system 120 (of an electronic device 102 (e.g., of FIGS. 1 and 2)) includes at least one power adapter coupler 124 (PAC 124), at least one charging controller 128, two or more chargers 126, and at least one switch 302. More specifically, a first power source adapter 104-1 provides or operates in accordance with a first charging type 232-1, and a second power source adapter 104-2 provides or operates in accordance with a second charging type 232-2. The power system 120 includes a first charger 126-1 and a second charger 126-2. The power adapter coupler 124, the first charger 126-1, and the second charger 126-2 are coupled to the switch 302. The charging controller 128 is also coupled to the switch 302. Although two chargers 126-1 and 126-2 are explicitly shown in FIG. 3, more or fewer chargers may alternatively be included in the power system 120 or the electronic device 102.

In example implementations, the first charger 126-1 corresponds to the first charging type 232-1, and the second charger 126-2 corresponds to the second charging type 232-2. The charging controller 128 selectively couples the first charger 126-1 or the second charger 126-2 to the power adapter coupler 124 using the at least one switch 302 based on which power source adapter 104 is connected to the power adapter coupler 124. If the first power source adapter 104-1 is connected to the power adapter coupler 124, the charging controller 128 causes the first charger 126-1 to be coupled to the power adapter coupler 124 via the at least one switch 302 responsive to detection or determination of the first charging type 232-1. If the second power source adapter 104-2 is connected to the power adapter coupler 124, the charging controller 128 causes the second charger 126-2 to be coupled to the power adapter coupler 124 via the at least one switch 302 responsive to detection or determination of the second charging type 232-2. The charging controller 128 can determine a charging type 232 via testing, measuring, unilateral or bilateral communication with the power source adapter 104 (e.g., by interrogating the adapter or detecting a broadcast/advertisement), and so forth.

In FIG. 3, the charging controller 128 can select or activate a charger 126 for charging using at least one switch 302. The at least one switch 302 can be implemented using, for example, a single-pole, multiple-throw (SPMT) switch, such as a single-pole, dual-throw (SPDT) switch for a two-charger environment. Alternatively, the at least one switch 302 can be implemented with multiple "individual" switches, such as two switches 302 for a two-charger environment. The charging controller 128 can control the multiple switches 302 in such cases. Switches can be implemented using, for example, one or more transistors. Transistors can include field-effect transistors (FETs), junction FETs (JFETs), bipolar junction transistors (BJTs), and so forth. With FETs, each FET can include at least one channel terminal, such as a first channel terminal and a second channel terminal, and a gate terminal. Channel terminals may include a drain terminal and a source terminal.

In FIG. 3, the charging controller 128 can control selection or activation of a given charger 126 using at least one switch 302 that is coupled between the power adapter coupler 124 and the multiple chargers 126-1 to 126-2. Alternatively, the charging controller 128 can control selection or activation of a given charger 126 using at least one switch that is coupled between the multiple chargers 126-1 and 126-2 and a battery or other charge consumer, such as a power domain 216. Example implementations using at least one switch coupled between the multiple chargers and the battery are described below with reference to FIG. 3-1. Further, some implementations may include (i) one or more switches coupled between the power adapter coupler 124 and multiple chargers and (ii) one or more switches coupled between the multiple chargers and the battery.

FIG. 3-1 illustrates another example approach 300-1 to selecting a charger 126 to adapt to a charging type for charging a battery 122-1. As illustrated, the power system 120 includes at least one power adapter coupler 124 and at least one transistor, such as a power transistor 304. The power transistor 304 can be implemented as, for instance, a power field-effect transistor (FET). The power system 120 also includes multiple chargers 126-1, 126-2, . . . , 126-N (with "N" representing a positive integer), multiple switches 302-1, 302-2, . . . , 302-N, and at least one charging controller 128. Although not so shown in FIG. 3-1, the multiple switches 302-1 to 302-N can be constructed in a single-pole, multiple-throw manner, with the single-pole coupled to the power transistor 304.

In example implementations, a first charger 126-1 is coupled to the power adapter coupler 124, and a second charger 126-2 is coupled to the power adapter coupler 124. A first switch 302-1 is coupled between the first charger 126-1 and the power transistor 304. A second switch 302-2 is coupled between the second charger 126-2 and the power transistor 304. Further, an "Nth" charger 126-N (e.g., a third charger) is coupled to the power adapter coupler 124, and an "Nth" switch 302-N (e.g., a third switch) is coupled between the "Nth" charger 126-N and the power transistor 304. The power transistor 304 can be coupled to a power storage unit 122, such as a battery 122-1 as depicted in FIG. 3-1. Any one or more of the chargers 126-1, 126-2, . . . , 126-N may be realized separately or may be integrated (e.g., monolithically).

The charging controller 128 can be coupled to the first switch 302-1 and the second switch 302-2. The charging controller 128 can also be coupled to the "Nth" switch 302-N to control a state (e.g., an open state or a closed state) of each of the "N" switches 302-1 to 302-N. In example operations, the charging controller 128 can selectively open or close any switch 302 of the multiple switches 302-1 to 302-N. For instance, the charging controller 128 can close the first switch 302-1 to connect the first charger 126-1 to the power transistor 304. Alternatively (or additionally), the charging controller 128 can close the second switch 302-2 to connect the second charger 126-2 to the power transistor 304. In some cases, one switch is closed to permit battery charging via the transistor by a respective charger, while other switches are opened to disable charging by those corresponding chargers. In other cases, multiple switches may be in a closed state at a same time to enable multiple chargers to provide charge to the battery simultaneously. Further, although not so depicted in FIG. 3-1, the power transistor 304 may operate as another switch (e.g., another switch 302) to gate access to the battery 122-1 by one or more chargers 126-1 to 126-N.

FIG. 3-2 illustrates an example approach 300-2 to selecting a charger 126 to adapt to a charging type 232 of a power source adapter 104 with example evolutions of charging modes for the electronic device 102. The approach 300-2 includes a power source adapter 104 (PSA 104), which may be realized, for instance, as a USB charger that is physically coupled to a power adapter coupler 124 (PAC 124). By way of example, the first charger 126-1 can be realized as a buck-boost charger (e.g., a buck-boost converter or a buck-boost voltage regulator), and the second charger 126-2 can be realized as a bypass charger, which may also be called a direct or passthrough charger. The at least one switch 302 can be realized, by way of example, as a first switch 302-1 that may be part of the buck-boost converter and a second switch 302-2 that may be separate from any one or more, and up to all, chargers. As shown, the second switch 302-2 can be coupled between (i) the first and second chargers 126-1 and 126-2 and (ii) the battery 122-1.

Thus, in example implementations, a charging system can support at least two configurations. A first configuration comprises a buck-boost configuration that can accommodate legacy power sources. A second configuration comprises a bypass charging configuration to accommodate variable voltage power sources and to provide a relatively higher efficiency. The FETs for the buck-boost charger (e.g., four to six FETs as described below) as well as an FET for the bypass charger or to gate the battery 122-1 can be integrated on a same chip or may be located externally on a separate chip. Further, an alternative first or second configuration, or an additional third configuration, may comprise a capacitive divider charger (not shown in FIG. 3-2). The first charger 126-1 may alternatively be realized with a buck charger or with a boost charger, instead of the depicted buck-boost charger.

A bypass charger can be implemented in any of multiple manners. Example implementations, such as the depicted one, may include at least one wire extending from the power adapter coupler 124 to the switch 302-2 that gates access to the battery 122-1. In some cases, no additional switches or reactive elements are included in the bypass charger if the power source adapter 104 (PSA 104) can properly control the charging. In other cases, at least one switch or other control component (e.g., for measuring or limiting current or voltage) may be included as part of the bypass charger. A buck-boost charger can be implemented in any of multiple manners. Example implementations, such as the depicted one, may include multiple power transistors 308-1 to 308-6 and at least one inductor 310. In this example, the charging controller 128 can be implemented at least partially as part of the buck-boost charger 126-1. The charging controller 128 can control a state of the switches 302-1 and 302-2 and/or any of the power transistors 308-1 to 308-5 to control the charging of the battery 122-1.

In addition to or instead of the operational characteristics (e.g., parameters, charging types, and charge states) otherwise described herein, the charging controller 128 can control the switches and FETs depicted in FIG. 3-2 based on one or more parameters. For example, the charging controller 128 can control operation based on an input current sensed by a current sensor 312 responsive to an indication signal 315 accepted from an input current limiter 314 (ICL 314), which may use a target input current. Similarly, the charging controller 128 can control operation based on an output current sensed by a current sensor 316 responsive to an indication signal 319 from an output current monitor 318, which may refer to a target output current. Further, the charging controller 128 can control operation based on an output voltage (V.out) and a target output voltage that are used by an output voltage monitor 320. The output voltage monitor 320 can indicate, for instance, whether the output voltage is less than or more than the target output voltage using a voltage indication signal 321.

FIG. 3-3 illustrates an example approach 300-3 to adapting to a single charging type with a passthrough charging mode. The example approach 300-3 is applicable to, for example, computing devices like laptops, entertainment devices, security devices, and other devices that are powered with multicell batteries. As power source adapters evolve and time elapses, a power source adapter that provides a fixed voltage charging type 232-A (of FIG. 2-1) may become outdated and only infrequently encountered. Accordingly, electronic devices may cease to use a buck-boost converter for interfacing with a fixed-voltage power source adapter 104. Thus, a buck-boost configuration may become surplusage or vestigial.

In such an environment, an electronic device may omit a buck-boost converter to save space and reduce costs. In example implementations, an electronic device may still include at least a bypass configuration as depicted in FIG. 3-3. Here, in the example approach 300-3, the power source adapter 104 is coupled to a power source 322 (e.g., a wall socket or an external battery) and a switch 302-1. The power source adapter 104 can be coupled between the power source 322 and the switch 302-1.

A multicell battery 122-2 and a charging controller 128-2 are also coupled to the switch 302-1. The switch 302-1 can be coupled between the power source adapter 104 and the multicell battery 122-2 to gate access to the battery. The charging controller 128-2 may include monitor circuitry or control circuitry (including both) to oversee the charging or to communicate with the power source adapter 104. The charging controller 128 may include at least one other switch 302-2 (not explicitly depicted) that can control, for instance, current flow in a power system. In some cases, the charging controller 128-2 may be incorporated into an SoC, a PMIC, a microcontroller unit (MCU), and so forth.

Figure 4:
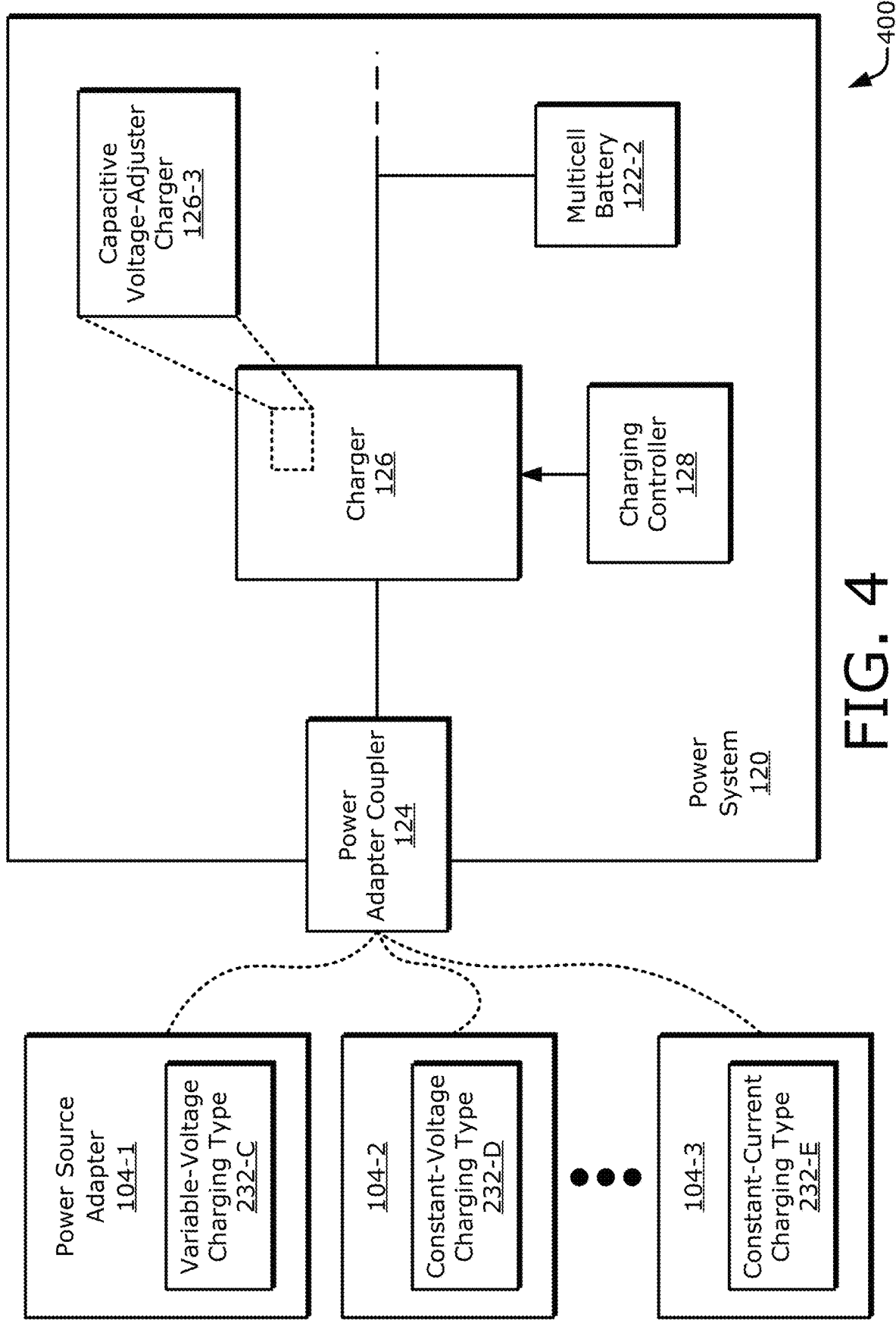
FIG. 4 illustrates an example approach to adapt a power system of an electronic device to a charging type or ability of a power source adapter.
Figures 1, 4:
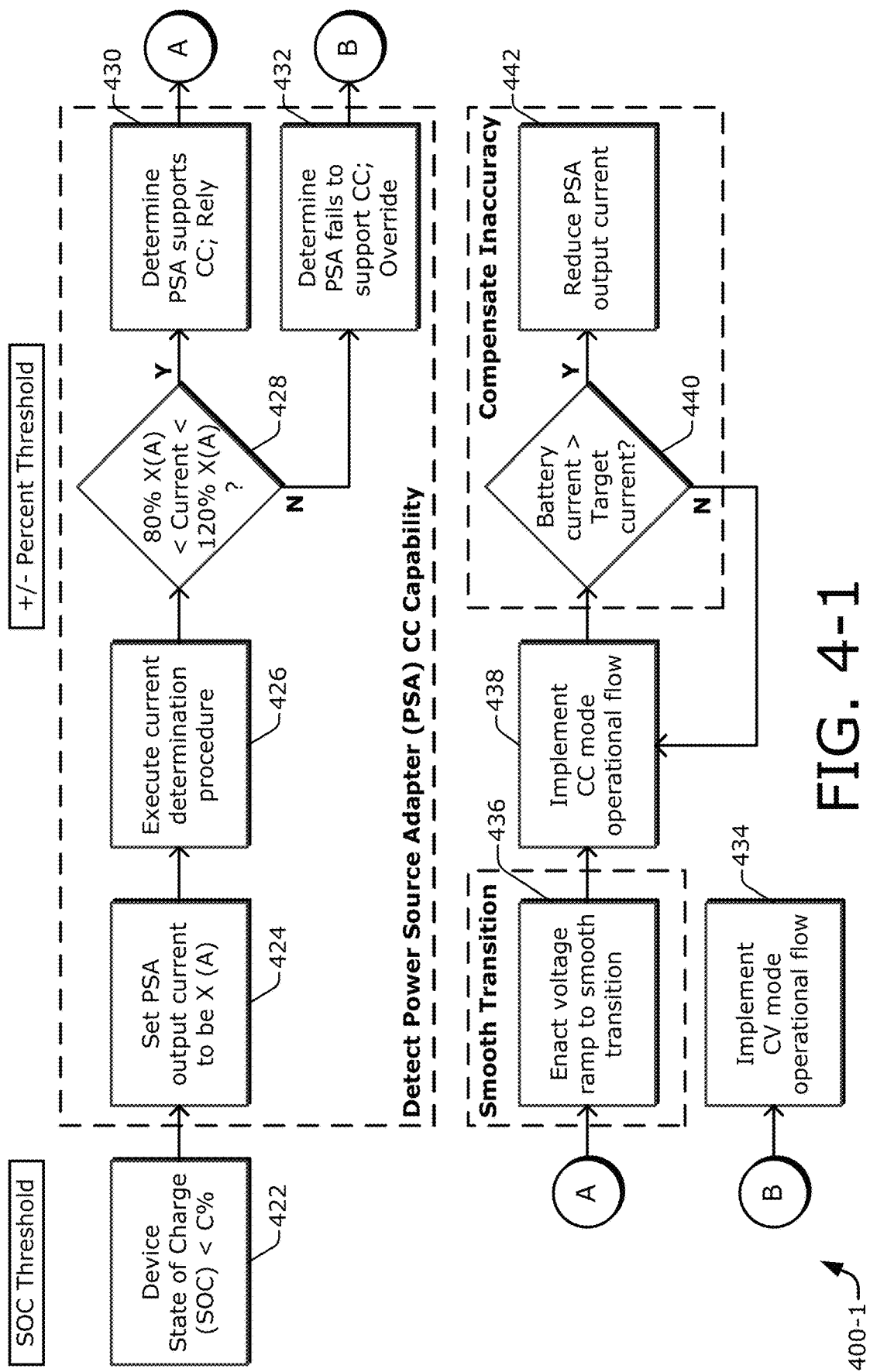
Figures 2, 4:
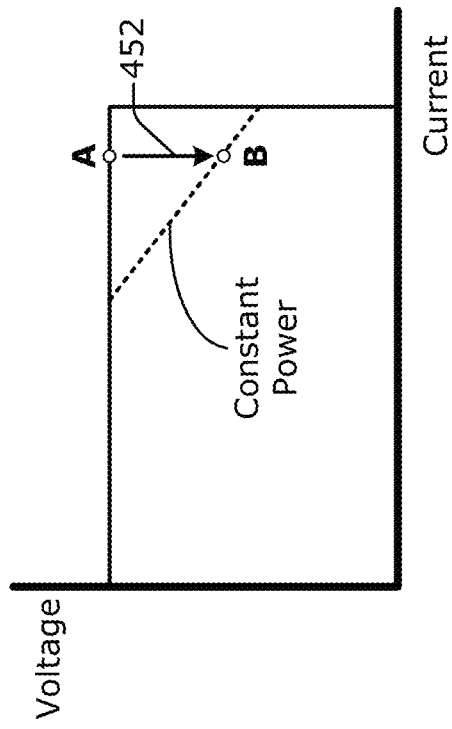
Figures 3, 4:
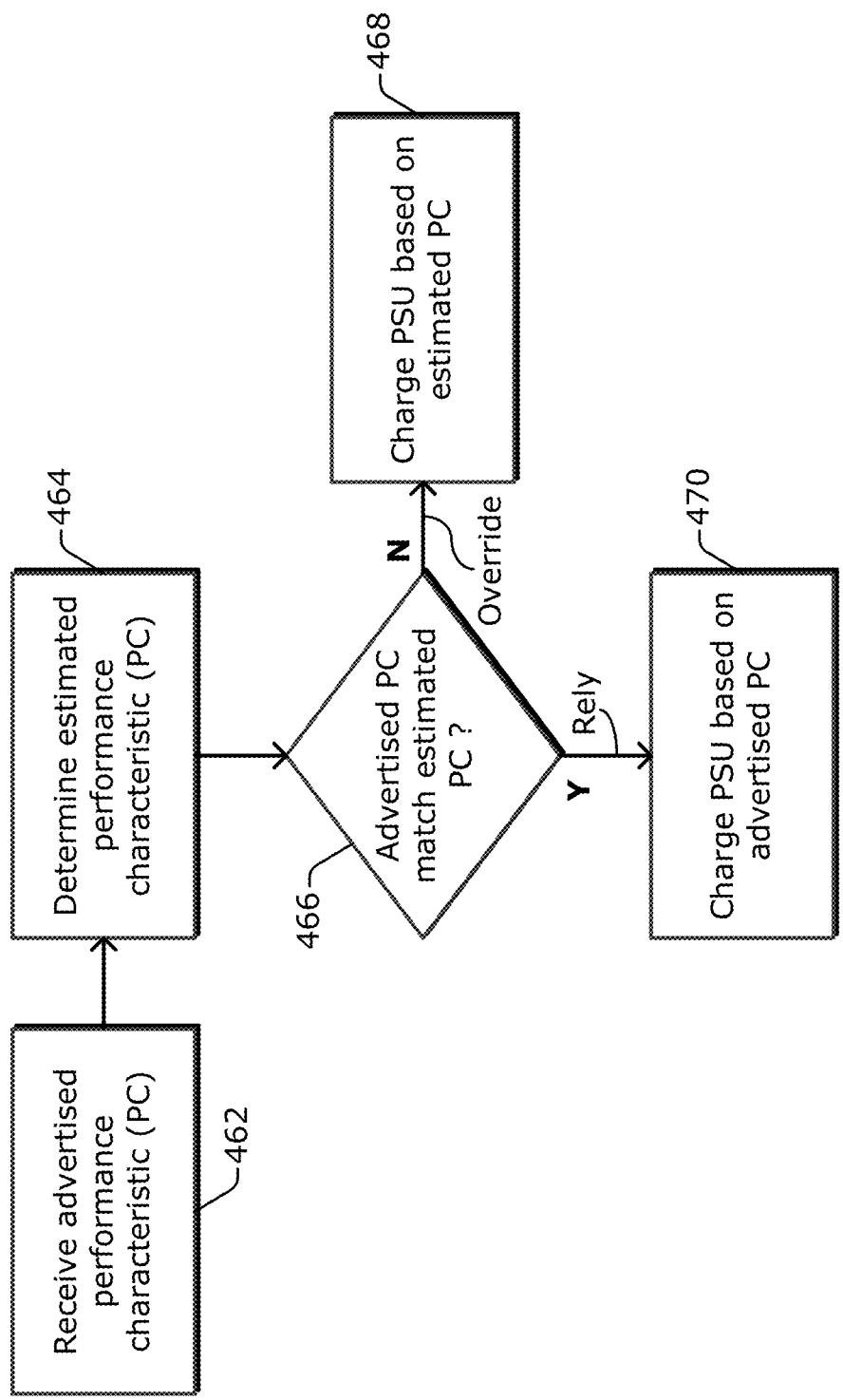

FIG. 4 illustrates an example approach 400 to adapt a power system 120 of an electronic device to a charging type or ability of a power source adapter 104. As shown, a first power source adapter 104-1 provides or operates in accordance with a variable-voltage charging type 232-C (e.g., with a relatively higher maximum voltage), and a second power source adapter 104-2 provides or operates in accordance with a constant-voltage (CV) charging type 232-D. Further, another power source adapter 104 (of multiple power source adapters as represented by the ellipsis), such as a third power source adapter 104-3, may provide or operate in accordance with a constant-current charging type 232-E. It should also be understood that the variable-voltage charging type 232-C can support constant-voltage charging and/or constant-current charging. Each power source adapter 104 may be connected to a power adapter coupler 124 of the power system 120. Although one power adapter coupler 124 is depicted, a power system 120 may include multiple power adapter couplers.

In example implementations, the power system 120 includes, in addition to the power adapter coupler 124, a charging controller 128, a charger 126 (e.g., a capacitive voltage-adjuster charger 126-3), and a multicell battery 122-2. The capacitive voltage-adjuster charger 126-3 is coupled to the power adapter coupler 124, the multicell battery 122-2, and the charging controller 128. Although the capacitive voltage-adjuster charger 126-3 and the approach 400 are depicted and described in terms of the multicell battery 122-2, the principles are applicable to a single-cell battery or a power storage unit 122 generally.

The capacitive voltage-adjuster charger can result in an efficient battery charging. However, this architecture can put additional restrictions on the adapter to provide a proper operating voltage. An amount of current that a capacitive voltage-adjuster charger can provide is determined, at least partly, by its input and output voltage difference. Connecting or placing a given power source adapter 104 into a constant-current (CC) mode (e.g., an output current limit mode) can reduce the difficulty of controlling the output current of the capacitive voltage-adjuster charger 126-3. A capacitive voltage-adjuster charger 126-3 can be realized using, for instance, a switched capacitive charger. A switched capacitor charger can be implemented using, for example, a capacitive-divider charger to decrease a voltage level or a capacitive-multiplier charger (e.g., a charge pump) to increase a voltage level.

Some power source adapters may not advertise their capabilities, whether such adapters support a CC mode or not. Other power source adapters may advertise certain abilities, such as a CC mode. Still other power source adapters may incorrectly or imprecisely advertise their abilities (e.g., whether the PSA can operate in a given charging mode) or their capabilities (e.g., whether the PSA can provide a current or voltage within a given range defined by a first threshold and a second threshold).

In some cases, a power source adapter supports a CC mode. Examples include a USB PD-compliant adapter with a programmable power supply (PPS) ability, some propriety adapters, and so forth. However, there are other noncompliant PD adapters that claim to support PPS but actually support a constant voltage (CV) mode (e.g., a regulated output voltage mode) but not the CC mode. Failing to support the CC mode can result in an improper voltage on the adapter output, which may adversely affect the output current of the capacitive divider charger. With uncontrolled current levels in the power system 120, reliability and safety issues are created for the power system 120 that are dangerous for the battery specifically and the electronic device generally. To address this concern, a procedure is described below with reference to FIG. 4-1 to determine (e.g., check or verify) whether a connected power source adapter provides a CC mode ability or an expected CC range capability.

For several reasons, a CC mode for charging can provide superior performance over a CV mode. First, the charging process flow, control functionality, or power system architecture can be simpler for a CC mode because there are fewer "abnormal" conditions for the charging controller 128 to be monitoring and responsively adjusting to. Second, a CC mode can provide better current control which in certain charging implementations (e.g., capacitive divider-based charging implementations) can reduce voltage fluctuations. Voltage fluctuations may, in turn, cause current fluctuations, which risk over-charging the battery. Third, CC mode can offer better behavior and control in cases in which the system load comes in and out (e.g., rises and falls or starts and stops). For instance, charge current can be automatically reduced to support the system load. Also, there can be better behavior and control because the CC mode can reduce, if not eliminate, the entering of a charging operation while the input current is limited, which may result in an inefficient operational phase. Further, entering the charging operation when the input-to-output voltage window is suboptimal due to system transient can be obviated. Permitting the charge pump to reduce its duty cycle to limit current can result in inefficient operation and can generate more heat inside an electronic device. In contrast, enabling the power adapter to operate in CC mode can provide a current limit that does not add more heat inside the electronic device.

FIG. 4-1 is a flow diagram illustrating an example technique 400-1 for adapting a power system to a charging type or ability of a power source adapter. The technique or process 400-1 is described in the form of a set of blocks 422-442 that specify operations that can be performed. However, operations are not necessarily limited to the order shown in FIG. 4-1 or described herein, for the operations may be implemented in alternative orders or in fully or partially overlapping manners. Also, more, fewer, and/or different operations may be implemented to perform the process 400-1 or an alternative process. Further, the parameter values (e.g., 80% or 120%), flag settings (e.g., operation mode flag (OMF) bit), etc., that are described or set forth below are provided by way of example only. Other threshold values, flags, and so forth can be employed instead.

The technique 400-1 can, for instance, detect issues or mitigate/resolve issues with a noncompliant USB PD PPS adapter or other adapters that advertise performance characteristics or that perform in manners that are inconsistent with an advertised performance characteristic. A first example issue is that the power source adapter 104 may falsely advertise PPS without supporting a CC mode (e.g., an adapter may support a CV mode but not a CC mode). An automatic input current limit (AICL) function can be used to detect this issue. A second example issue is that the transient resulting from transitioning between a CV mode and a CC mode can present a safety concern due to a large current spike. This issue can be addressed—e.g., at least partially ameliorated—by employing smoother steps in a voltage ramping process. In some cases, the transition smoothing may be accomplished by, for instance, utilizing the power source adapter's operation mode flag (OMF) bit. A third example issue arises from an inaccurate current limit capability by a power source adapter that does have a CC mode ability. To address this third issue, the battery current can be monitored to compensate for the inaccuracy.

Initially, at block 422, the CC mode may be gated based on a battery state of charge (SOC) that is determined responsive to the power source adapter being coupled to a power adapter coupler 124 of an electronic device. The CC mode gating can be based on an SOC threshold. In the depicted example, the CC mode is entered if the SOC is less than 80% of the maximum charge. If the SOC is above the SOC threshold (e.g., greater than 80%), a different charging method may be employed. Other SOC thresholds may be used in the gating analysis.

A CC mode capability can be detected with the operations of at least a portion of the blocks 424 to 432. At block 424, the power source adapter (PSA) output current is established to be "X(A)" (or "X" amps)—e.g., based on a request by the power system 120 or a notification from the power source adapter 104. To execute a current determination procedure at block 426, the charging controller 128 can run, for instance, an AICL function to detect the output current of the power source adapter 104 (e.g., the input current 204 of FIG. 2 from the perspective of the power system 120). Alternatively, the PMIC input current limit can be increased step by step while the input current and the voltage produced by an ADC is being monitored. Responsive to the input voltage dropping to a certain threshold, the input current is recorded to determine the current capability. At block 428, the charging controller 128 compares the detected current to the established current X(A). More specifically, the detected current can be compared to a plus/minus percent threshold (or lower threshold and upper threshold) of the established current X(A). In the depicted example, the lower threshold is 80% of the established current X(A), and the upper threshold is 120% of the established current X(A). However, other percent thresholds, different plus versus minus thresholds, and so forth can be implemented. Further, an absolute current differential or offset, such as 100 milliamps (100 mA), can be used to determine a first threshold and a second threshold, which may be based on the established current X(A).

Thus, the charging controller 128 can ascertain or detect if the input current is above the lower threshold and below the upper threshold at block 428. If the detected current fails to comport with the at least one threshold, then at block 432 the power system 120 considers the power source adapter 104 to be able to offer CV mode but not CC mode. The charging controller 128 can therefore choose to override an advertised performance capability of the power source adapter 104. Accordingly, as indicated by the encircled "B" reference, the power system 120 interfaces with the power source adapter 104 in accordance with a procedure for CV mode at block 434. For example, the charging algorithm performed by the power system 120 of the electronic device can follow CV-based charging protocols.

On the other hand, if the detected current does comport with the at least one threshold, which may be based on the established current X(A) (as checked at block 428), then at block 430 the power system 120 can consider the power source adapter 104 to be able to offer CC mode with a designated performance capability. The power system 120 therefore operates as if the power source adapter 104 can support the CC mode. This can entail the power system 120 relying on the power source adapter 104 to provide a specified current within a target range to charge a battery.

Further, as indicated by the encircled "A" reference, the power system 120 can institute a smoothing transition. To do so, the power system 120 can implement, at block 436, a voltage ramp with the power source adapter 104. In some cases, the charging controller 128 can use at least one operation mode flag (OMF) bit to cause the power source adapter 104 to increase voltage levels in smaller step sizes. At block 438, the charging controller 128 interfaces with the power source adapter 104 in accordance with a procedure for CC mode.

An inaccurate current limit can be compensated for with at least a portion of the operations at blocks 440 and 442. At block 440, the charging controller 128 determines if the battery current is greater than a target current (e.g., higher than a target battery current threshold). If not, then the power system 120 continues to interface with the power source adapter 104 in accordance with the procedure for CC mode. If, on the other hand, the battery current is greater than the target battery current, the adapter output current is reduced at block 442. For example, the charging controller 128 can instruct the power source adapter 104 to lower the output current thereof.

The technique 400-1 can address an incomplete or inaccurate advertisement by the power source adapter 104 through at least one test. Other example tests (e.g., by a power system 120 or a charging controller 128 thereof) are described below to ensure that the power source adapter is making accurate claims as to its abilities and capabilities to thereby protect the battery and the power system. First, it can be detected whether the power source adapter/accessory can support the voltage range it advertises. To do so, the system can start by asking minimum and maximum voltage of the broadcasted voltage range and, via an ADC channel (or a comparator), test if the range is indeed supported. Some error correction may be employed to adjust for voltage drops; thus, this test can be performed when the electronic device does not draw meaningful current from the power source, or impedance from the output of the power adapter to the input of the power system/charger can be measured or accounted for to ensure voltage-reading accuracy. Second, it can be detected whether the power source adapter/accessory can support the voltage steps it advertises. To do so, the system can ask for a few different voltage levels within a narrow window and determine the voltage resolution.

Third, it can be detected whether or not the power source adapter/accessory can support a constant power mode that is advertised by the power source adapter. To do so, the system can ask for a voltage that is within the defined constant power range. If the current does not reduce linearly, the charging controller can infer that the power source is incorrectly advertising a constant power mode. Conversely, if an electronic device does not expect constant power and asks for a specific voltage-current ratio (V/I), but the power system 120 of the device is rejected by the power source adapter, the power can collapse or be inadequate. In other words, regardless of whether a power source adapter 104 does or does not support constant power or is or is not in a constant power mode, if the power system 120 of the electronic device 102 is operating under a conflicting or inaccurate "belief," the powering or charging can be less efficient or hazardous.

FIG. 4-2 depicts an example graph 400-2 illustrating a constant power environment relative to a voltage-current relationship. The graph 400-2 depicts voltage versus current to reflect how some power source adapters may advertise a voltage-current relationship relative to constant power performance. An example constant-power performance characteristic is illustrated with the dotted line. If a power accessory advertises that it does not support a constant power mode, but it actually does, the electronic device can expect a power level at a point A based on a requested voltage and current relationship. However, the power system only receives a power level at point B in such a situation, which is lower than that of point A as indicated by arrow 452, due to the unknown constant power or power limitation (e.g., a USB PPS power limitation) of the power source adapter. For example, if a power system 120 of an electronic device 102 requests an increase in voltage and the power adapter is operating in a constant power mode, the power adapter reduces the current to maintain the constant power level as the voltage is increased. This situation can limit power, collapse the system, reduce charging, and so forth. Accordingly, a power system 120 can provide power more smoothly, safely, or efficiently if the charging controller 128 is accurately informed as to if, or whether, a power source adapter 104 is providing power in a constant power mode.

FIG. 4-3 is a flow diagram illustrating an example technique 400-3 for adapting a power system 120 to a performance characteristic of a power source adapter 104. The technique or process 400-3 is described in the form of a set of blocks 462-470 that specify operations that can be performed. However, operations are not necessarily limited to the order shown in FIG. 4-3 or described herein, for the operations may be implemented in alternative orders or in fully or partially overlapping manners. Also, more, fewer, and/or different operations may be implemented to perform the process 400-3, or an alternative process.

At block 462, a charging controller 128 can receive from the power source adapter 104 at least one indication of an advertised performance characteristic. For example, the power source adapter 104 may set one or more bits in at least one register of the power system 120. At block 464, the charging controller 128 can determine at least one estimated performance characteristic of the power source adapter 104 that is coupled to a power adapter coupler 124 of an electronic device 102. Examples of performance characteristics include a charging type, a charging mode, a fixed or variable voltage level or range, a fixed or variable current level or range, a constant power mode, some combination thereof, and so forth. Thus, a performance characteristic may correspond to, for instance, an ability to provide constant-current charging or a capability to maintain a constant current within a current range, including an upper current threshold level and a lower current threshold level. The estimation of a performance characteristic may entail testing or detecting an ability, like constant-voltage charging, constant-current charging, constant-power charging, and so forth.

At block 466, the charging controller 128 can determine if the advertised performance characteristic comports with or otherwise matches the estimated performance characteristic. If not, then at block 468 the charging controller 128 can charge a power storage unit 122 using the power source adapter 104 based on the estimated performance characteristic. For example, the charging controller 128 may override the power source adapter 104 and control a constant voltage or constant current charging mode, or the charging controller 128 may override the advertised performance characteristic by ensuring that a charging current stays within a target current range. On the other hand, if the advertised performance characteristic does match the estimated performance characteristic (as determined at block 466), then at block 470 the charging controller 128 can rely on the power source adapter 104 to charge the power storage unit 122 based on the advertised performance characteristic.

Figure 5:
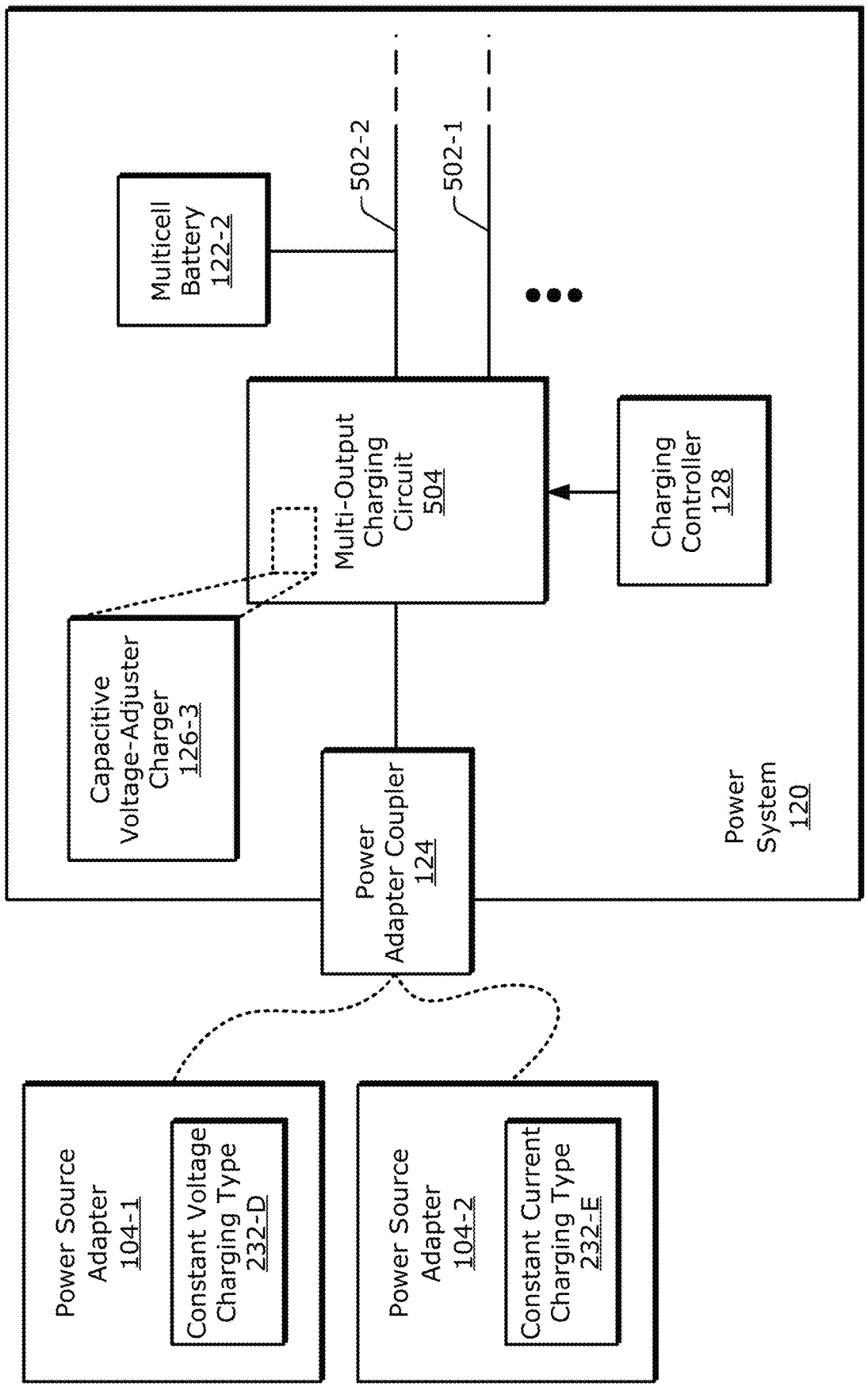
FIG. 5 illustrates an example approach to adapt a power system of an electronic device to provide power to multiple voltage rails using a multi-output charging circuit in conjunction with a power source adapter.
Figures 1, 5:
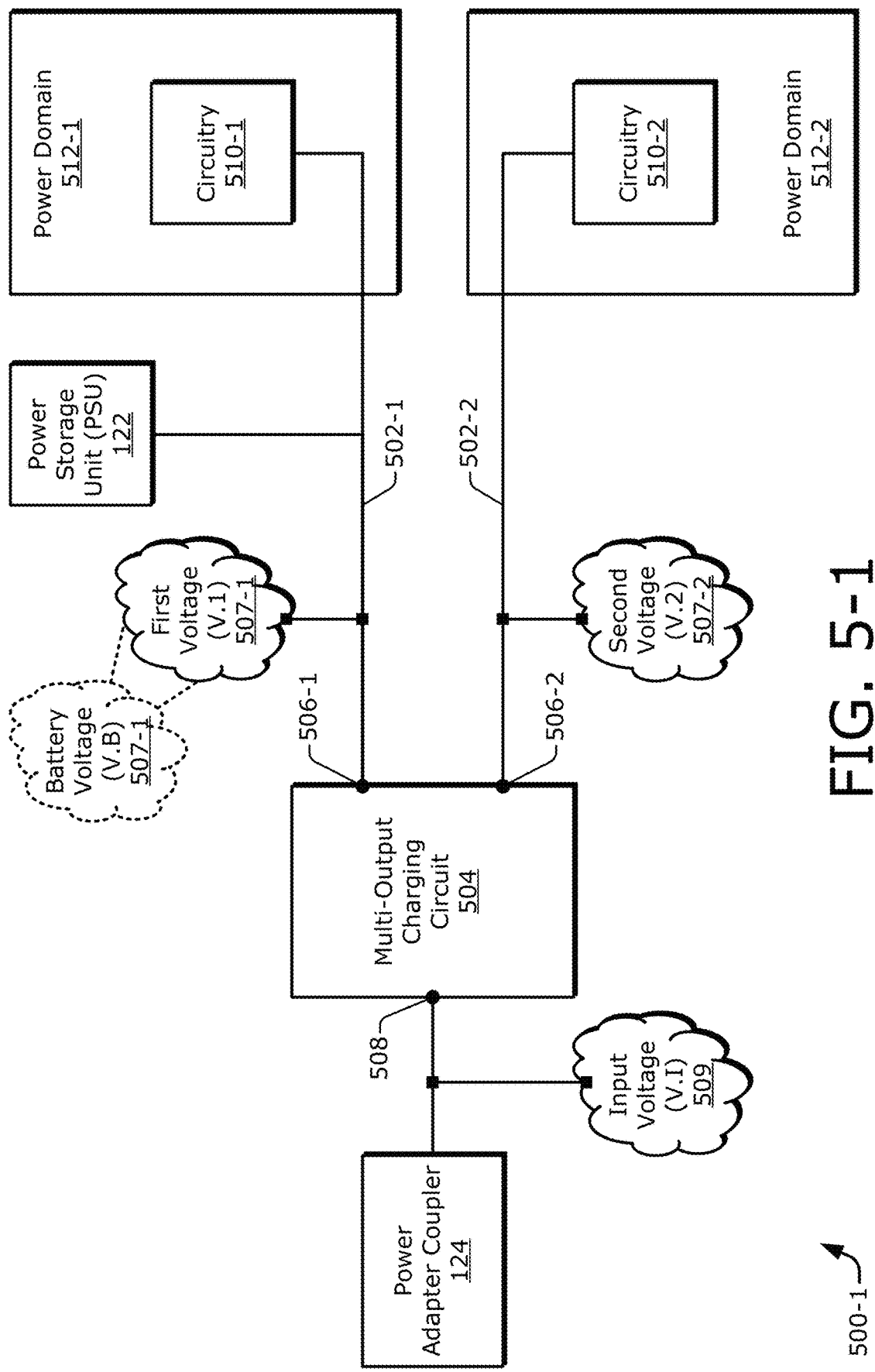
Figures 2, 5:
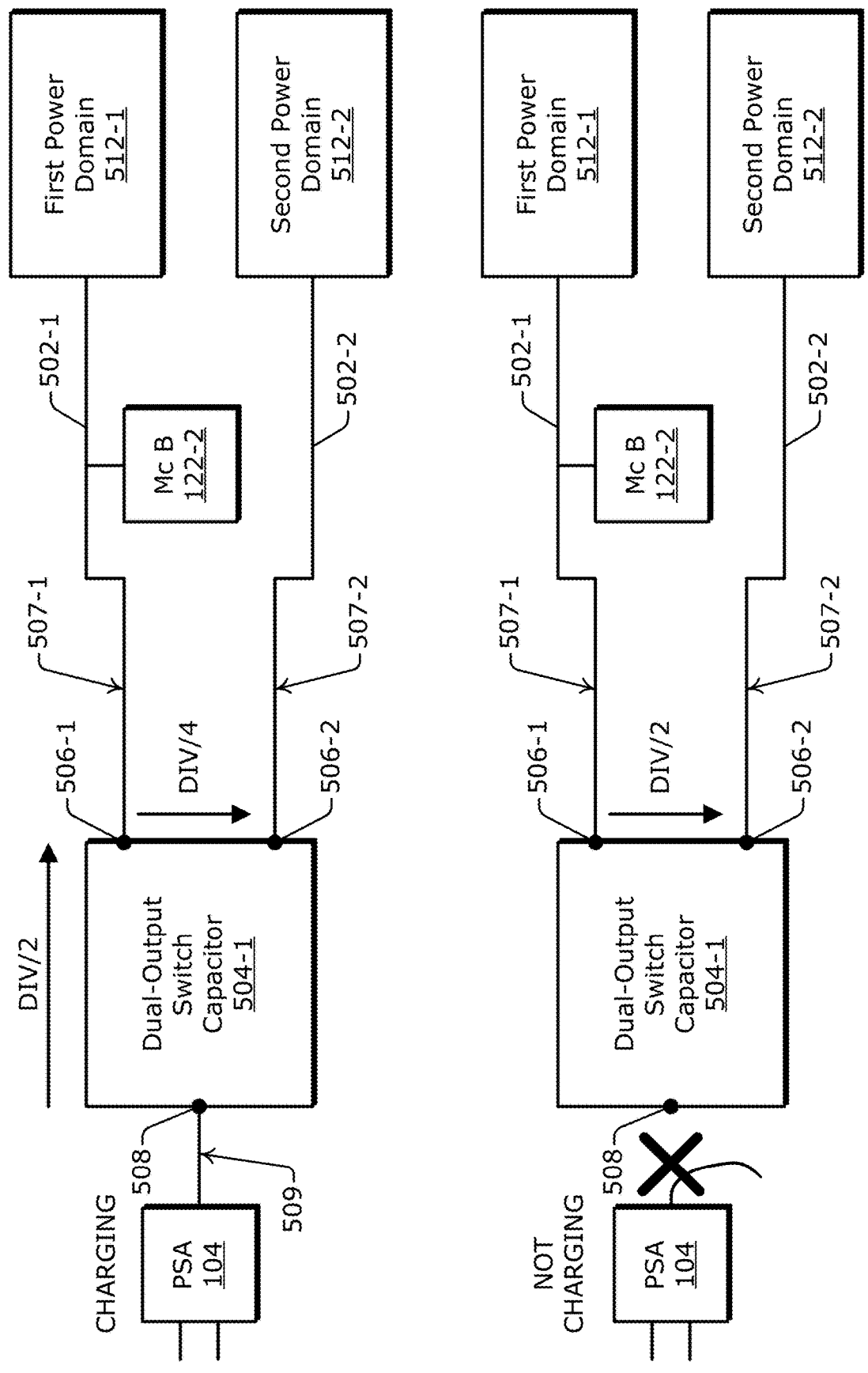
Figures 3, 5:
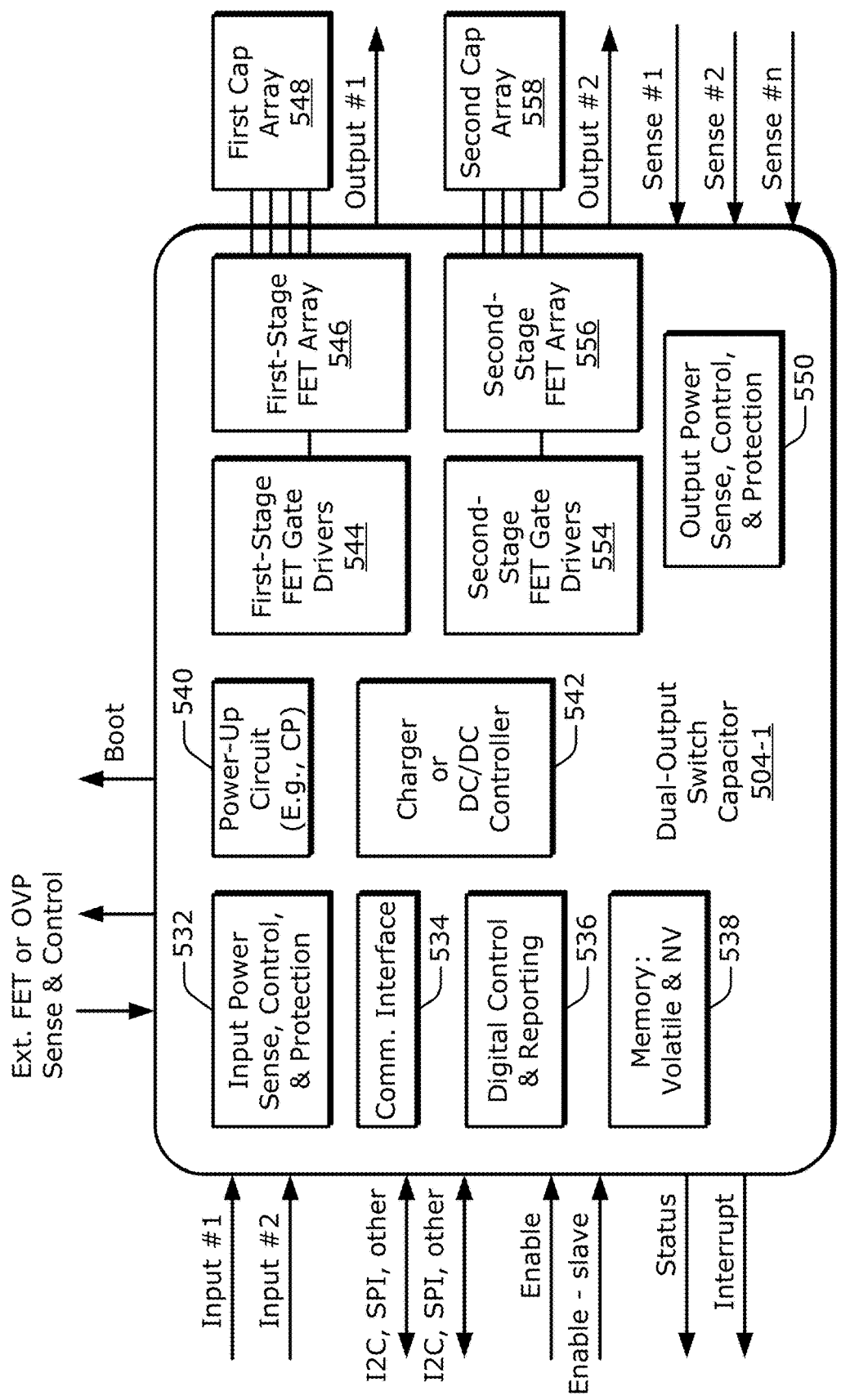
Figures 4, 5:
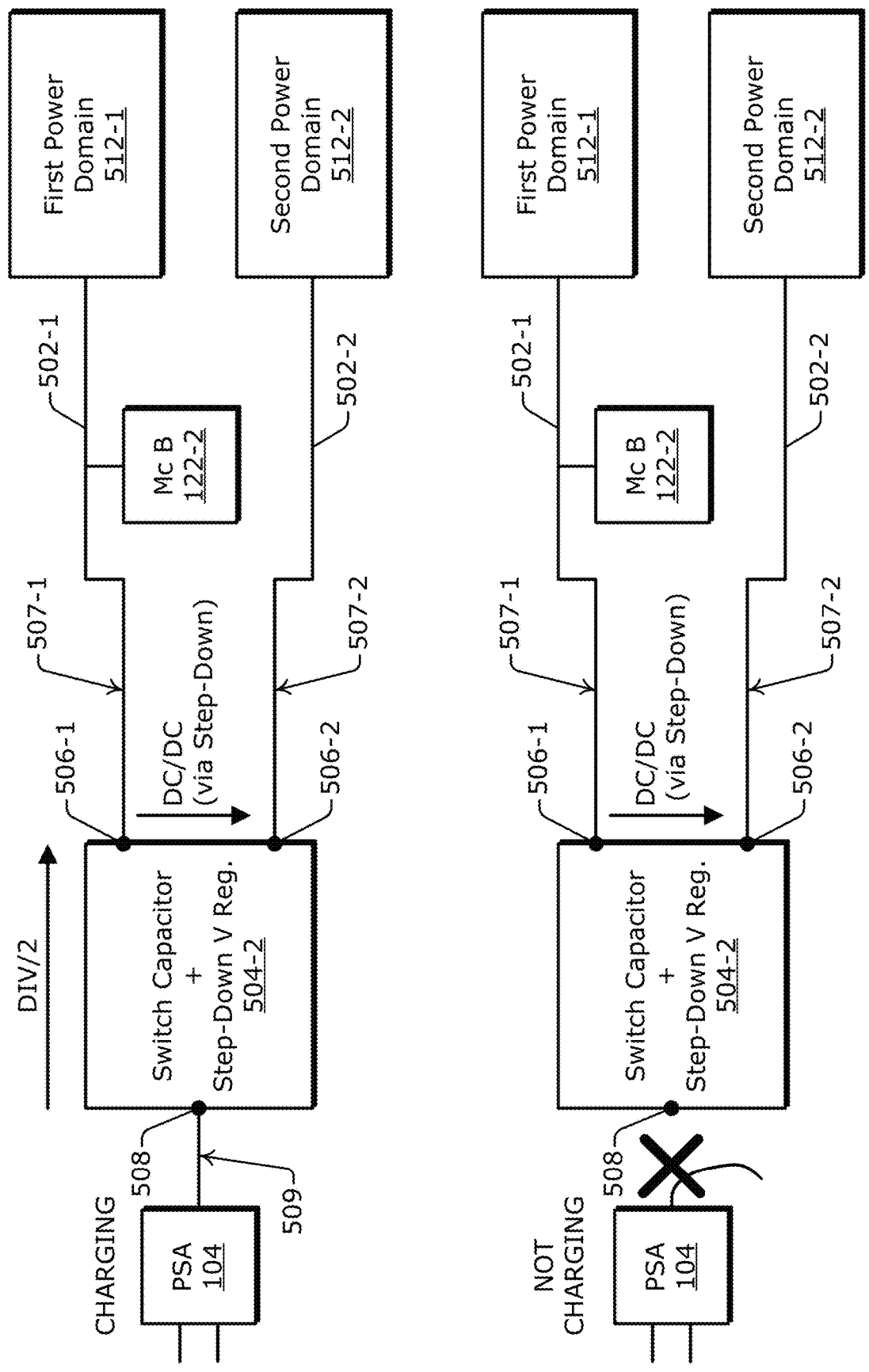
Figure 5:
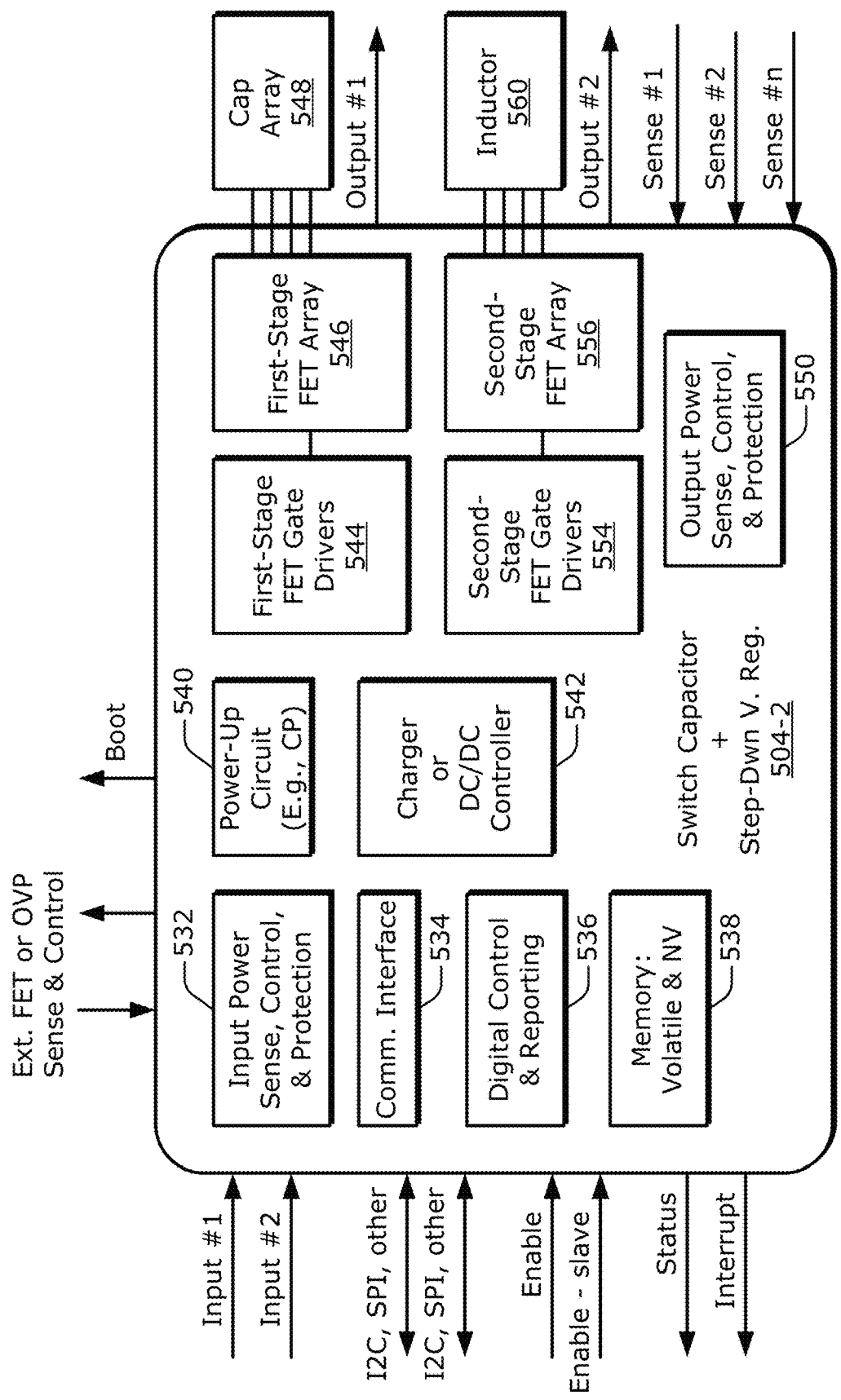

FIG. 5 illustrates an example approach 500 to adapt a power system 120 of an electronic device to provide power to multiple voltage rails 502 using a multi-output charging circuit 504 in conjunction with a power source adapter 104. The approach 500 has circuitry arranged similarly to that of the approach 400 of FIG. 4. However, the multi-output charging circuit 504 is coupled to a first voltage rail 502-1 and a second voltage rail 502-2. In some cases, the multi-output charging circuit 504 can be realized using at least one capacitive voltage-adjuster charger 126-3.

In example implementations, each voltage rail 502 of the multiple voltage rails 502-1 and 502-2 provides or is held to a different respective voltage level. For example, the first voltage rail 502-1 can correspond to a first voltage level, and the second voltage rail 502-2 can correspond to a second voltage level. In some cases, the first voltage level can comprise a relatively higher voltage level, and the second voltage level can comprise a relatively lower voltage level. The multi-output charging circuit 504 can include a first output and a second output. As represented by the ellipsis, the multi-output charging circuit 504 can include more than two outputs (e.g., "M" outputs with "M" representing a positive integer) that are respectively coupled to more than two voltage rails, which are held to more than two voltage levels (e.g., "M" voltage rails that may be held at "M" different voltage levels).

FIG. 5-1 illustrates an example architecture 500-1 with a multi-output charging circuit 504 and at least two voltage rails 502-1 and 502-2. FIGS. 5-2 to 5-5 illustrate example implementations of architectures having a multi-output charging circuit 504. The example architecture 500-1 is described next, followed by the architectures of FIGS. 5-2 to 5-5. The architectures of FIGS. 5-3 and 5-5 depict example implementations of the multi-output charging circuit 504, which generally illustrates a charging circuit that can provide two or more voltage outputs for two or more power domains. The multi-output charging circuit 504 can, however, be implemented differently from the example multi-output charging circuits 504-1 and 504-2 of FIGS. 5-3 and 5-5, respectively. In some cases, such as where a portable device is using two batteries, one multicell battery and one single cell battery, a battery unit may be present at both rails (e.g., at high voltage and at low voltage).

As shown, the example architecture 500-1 includes a multi-output charging circuit 504 having a first output 506-1 and a second output 506-2. The first output 506-1 is coupled to a first power domain 512-1, and the second output 506-2 is coupled to a second power domain 512-2. Although only two power domains are explicitly depicted and described herein, a power system 120, or a multi-output charging circuit 504, may power more than (or less than) two power domains. In some cases, the multi-output charging circuit 504 is realized using at least one capacitive voltage-adjuster charger 126-3 (e.g., a switched capacitive-divider charger or a switched capacitive-multiplier charger) that includes the first output 506-1 and the second output 506-2. In other cases, the multi-output charging circuit 504 is realized using a capacitive voltage-adjuster charger 126-3 that includes the first output 506-1 and a voltage regulator (not shown in FIG. 5-1) that includes the second output 506-2. The voltage regulator can be a step-down voltage regulator or a step-up voltage regulator.

In example implementations, the architecture 500-1 includes a power adapter coupler 124, a power storage unit 122 (PSU 122), first circuitry 510-1 corresponding to a first power domain 512-1, second circuitry 510-2 corresponding to a second power domain 512-2, and a multi-output charging circuit 504. The multi-output charging circuit 504 includes an input 508, a first output 506-1, and a second output 506-2. The input 508 is coupled to the power adapter coupler 124. The first output 506-1 is coupled to the power storage unit 122 and the first circuitry 510-1. The second output 506-2 is coupled to the second circuitry 510-2. The multi-output charging circuit 504 can include at least one capacitor array (not shown in FIG. 5-1) coupled between the input 508 and the first output 506-1 as part of a capacitive voltage-adjuster charger 126-3.

In some cases, the capacitor array comprises a first capacitor array. The multi-output charging circuit 504 can include a second capacitor array coupled between the input 508 and the second output 506-2. In such cases, the multi-output charging circuit 504 can include a second capacitive voltage-adjuster charger 126-3 or one capacitive voltage-adjuster charger 126-3 with two capacitor arrays. In other cases, the multi-output charging circuit 504 can include a step-down voltage regulator coupled between the input 508 and the second output 506-2 in addition to a first capacitor array of a capacitive voltage-adjuster charger 126-3. Examples of the first and second circuitries 510-1 and 510-2 are described below with reference to FIGS. 5-2 to 5-5. Examples with capacitor arrays are described below with reference to FIGS. 5-3 and 5-5.

In example operations with two capacitor arrays, based on a power source adapter 104 (not shown in FIG. 5-1) being coupled to the power adapter coupler 124, the multi-output charging circuit 504 can divide or multiply, using a first capacitor array, an input voltage 509 (V.I 509) at the input 508 by a first value to produce a first voltage 507-1 (V.1 507-1) for the first output 506-1. The multi-output charging circuit 504 can also divide or multiply, using a second capacitor array, the input voltage 509 at the input 508 by a second value to produce a second voltage 507-2 (V.2 507-2) for the second output 506-2. Here, the first voltage 507-1 can be greater than the second voltage 507-2 for a divide operation; the first voltage 507-1 can be less than the second voltage 507-2 for a multiply operation. Based on the power source adapter 104 being uncoupled from the power adapter coupler 124, the multi-output charging circuit 504 can divide or multiply, using at least one of the first capacitor array or the second capacitor array, the first voltage 507-1 at the first output 506-1 by a third value to produce the second voltage 507-2 for the second output 506-2. Here, the first voltage 507-1 corresponds to, and can be provided by, the power storage unit 122. Generally, the first voltage 507-1 can be greater than or less than the second voltage 507-2. Additionally, a single power storage unit 122 may be coupled to one power domain, or respective power storage units may be coupled to respective power domains.

FIG. 5-2 illustrates an example system architecture 500-2, including a dual-output switch capacitor 504-1 implementation of a multi-output charging circuit 504. Generally, a dual-output capacitive divider 504-1 allows for higher efficiency conversions for charging and system powering. This can accelerate a charging time or extend usable battery life. This architecture can also eliminate, or at least reduce, the need for a more-complicated battery pack construction, such as one with a center tap. FIGS. 5-2 and 5-3 are primarily described in terms of a dual-output capacitive divider 504-1 that reduces one or more voltage levels (e.g., by halving them with each switched capacitor array). However, the multi-output charging circuit 504 (of FIGS. 5 and 5-1) can alternatively be implemented with a dual-output capacitive multiplier 504-1 that increases one or more voltage levels (e.g., by doubling them with each switched capacitor array). In such cases, the multicell battery 122-2 may be coupled to the second output 506-2.

In example implementations, a power source adapter 104 (e.g., a travel adapter (TA) or USB adapter) can be connected to the dual-output switch capacitor 504-1. In the upper diagram of FIG. 5-2, the adapter is connected, and the electronic device is charging. In the lower diagram, the adapter is disconnected, and the electronic device is not charging. The dual-output switch capacitor 504-1 is coupled to one or more relatively higher voltage domains (as represented by the first power domain 512-1) and the multicell battery 122-2 (Mc B 122-2) via the first voltage rail 502-1 (e.g., at 6V to 9V). High voltage domains may include circuitry of or for a screen, a power amplifier, and so forth. The dual-output switch capacitor 504-1 can also or instead be coupled to one or more downstream PMICs (e.g., as represented by the second power domain 512-2), which can power system circuitry, including a processor or a memory.

In the upper diagram, the dual-output switch capacitor 504-1 powers the electronic device using the adapter. The dual-output switch capacitor 504-1 performs a first DIV/2 operation to provide the first output voltage 507-1 (VOUT1), which is a relatively higher voltage for the first voltage rail 502-1. The dual-output switch capacitor 504-1 also performs a DIV/4 operation to provide the second output voltage 507-2 (VOUT2), which is a relatively lower voltage for the second voltage rail 502-2 (e.g., at 3V to 4.5V). By using a capacitive divider, each voltage conversion operation that involves a halving of the voltage results in the current being doubled.

In the lower diagram, the dual-output switch capacitor 504-1 powers the electronic device using the multicell battery 122-2. The dual-output switch capacitor 504-1 performs a DIV/2 operation to provide the second output voltage 507-2 (VOUT2), which is a relatively lower voltage for the second voltage rail 502-2, using the voltage battery (VBATT) of the first voltage rail 502-1. In this context, the first output voltage 507-1 corresponds to the voltage battery. Although the switch capacitor 504-1 is described as a dual-output switch capacitor, the switch capacitor may alternatively be implemented with a single output or with multiple outputs (e.g., a multi-output switch capacitor).

FIG. 5-3 illustrates an example architecture 500-3 for the dual-output switch capacitor 504-1 of FIG. 5-2. In example implementations, the architecture 500-3 includes one or more of the following blocks (which can be realized as circuitry and/or analog or digital logic) that can obtain the indicated data, provide the indicated data, or perform the described function. An input power sense, control, and protection block 532 can sense one or more input signals relating to power transfer, such as an input voltage, an input current, or an input power. The block 532 can sense parameters relating to, and provide control signals for, one or more external field-effect transistors (FETs) or at least one overvoltage protection (OVP) circuit.

A communication interface block 534 can communicate unidirectionally or bidirectionally using wired or wireless signals. The communication may be performed in accordance with a communication standard, such as an inter-integrated circuit (I2C) standard, a serial peripheral interface (SPI) standard, a system power management interface (SPMI) standard, and so forth. A digital control and reporting block 536 can receive enable signal(s) and produce status or interrupt signal(s). The block 536 can also incorporate a state machine or processor core to make functional decisions and monitoring decisions. The dual-output switch capacitor 504-1 can also include nonvolatile or volatile memory block 538.

A power-up circuit block 540 can instruct other circuitry (e.g., a charge pump (CP)) to boot up. A charger or direct-current/direct-current (DC/DC) control block 542 can provide some of the intelligence or control algorithms of the dual-output switch capacitor 504-1. An output power sense, control, and protection block 550 can sense one or more parameters that may be used by the dual-output switch capacitor 504-1 to implement a portion of the techniques that are described herein. The block 550 can sense, for instance, a voltage P, a voltage N, other battery node voltages, a system voltage, a current 1, a current 2, and so forth.

The dual-output switch capacitor 504-1 can further include or be coupled to FET control circuitry. The FET control circuitry includes first-stage FET gate drivers 544 and a first-stage FET array 546, which are coupled to one another. The first-stage FET array 546 is coupled to a first capacitor array 548 to produce an output signal #1. The FET control circuitry also includes second-stage FET gate drivers 554 and a second-stage FET array 556, which are coupled one to another. The second-stage FET array 556 is coupled to a second capacitor array 558 to produce an output signal #2. Although an example dual-output switch capacitor 504-1 is described above and depicted in FIG. 5-3 as having certain blocks with particular functions, a dual-output switch capacitor 504-1 can be implemented in alternative architectures and manners, such as with more, fewer, or different blocks that have various functionalities and interconnections.

In example operations, an output of the first stage circuitry can be fed as an input to the second stage circuitry. For instance, the second stage can be powered by the first stage. The output #1 of the first stage circuitry can correspond to the first voltage 507-1 (V.1) of FIGS. 5-1 and 6-2. Thus, the first capacitor array 548 can be switched as a capacitive voltage divider that achieves a desired voltage level based on the input voltage level 509 provided by the power source adapter 104. The output #2 can correspond to the second voltage 507-2 (V.2) of FIGS. 5-1 and 5-2. Thus, the second capacitor array 558 can be switched as a capacitive voltage divider that achieves a desired voltage level based on the voltage level provided by the adapter (as the input voltage 509 in the upper diagram of FIG. 5-2) or the voltage level provided by the battery (as the first voltage 507-1 from the multicell battery 122-2 in the lower diagram of FIG. 5-2).

FIG. 5-4 illustrates an example system architecture 500-4 including a switch capacitor in conjunction with a step-down voltage regulator 504-2. The architecture 500-4 is similar to the architecture 500-2 of FIG. 5-2. A difference between them is that the dual-output switch capacitor 504-1 of FIG. 5-2 is replaced by the switch capacitor in conjunction with the step-down voltage regulator 504-2. In example implementations, this hybrid approach includes a DIV/2 capacitive voltage divider, which can be used for voltage conversions between the input voltage 509 and the first voltage 507-1, and a step-down regulator for voltage conversions between the first voltage 507-1 and the second voltage 507-2 (or between the input voltage 509 and the second voltage 507-2). These respective circuitries can accommodate the high and low voltage rails, respectively. The step-down voltage regulator can convert DC/DC voltage levels. System power delivery with the voltage regulator, however, may not be as efficient as with the dual switch capacitor arrays as shown in FIG. 5-3. Using a voltage regulator as a second stage, on the other hand, enables the output voltage to be regulated, which contrasts favorably with the charge pump approach. FIGS. 5-4 and 5-5 are primarily described in terms of a switch capacitor in conjunction with a step-down voltage regulator 504-2 that reduces one or more voltage levels. However, the multi-output charging circuit 504 (of FIGS. 5 and 5-1) can alternatively be implemented with a switch capacitor in conjunction with a step-up voltage regulator 504-2 that increases one or more voltage levels. In such cases, the multicell battery 122-2 may be coupled to the second output 506-2.

FIG. 5-5 illustrates an example architecture 500-5 for the switch capacitor in conjunction with the step-down voltage regulator 504-2 of FIG. 5-4. The circuitry of the switch capacitor in conjunction with the step-down regulator 504-2 is similar to that of the dual-output switch capacitor 504-1 of FIG. 5-3. With the architecture 500-5, however, the second stage is coupled to an inductor 560 that is part of the step-down voltage regulator (not separately indicated) to provide the output #2. The second-stage FET array 556 can be configured, for example, as a high-side/low-side FET for a buck converter or as an H-bridge for a buck-boost converter. Although an example switch capacitor in conjunction with the step-down regulator 504-2 is described above and depicted in FIG. 5-5 as having certain blocks with particular functions, a switch capacitor in conjunction with the step-down regulator 504-2 can be implemented in alternative architectures and manners, such as with more, fewer, or different blocks that have various functionalities and interconnections.

Figure 6:
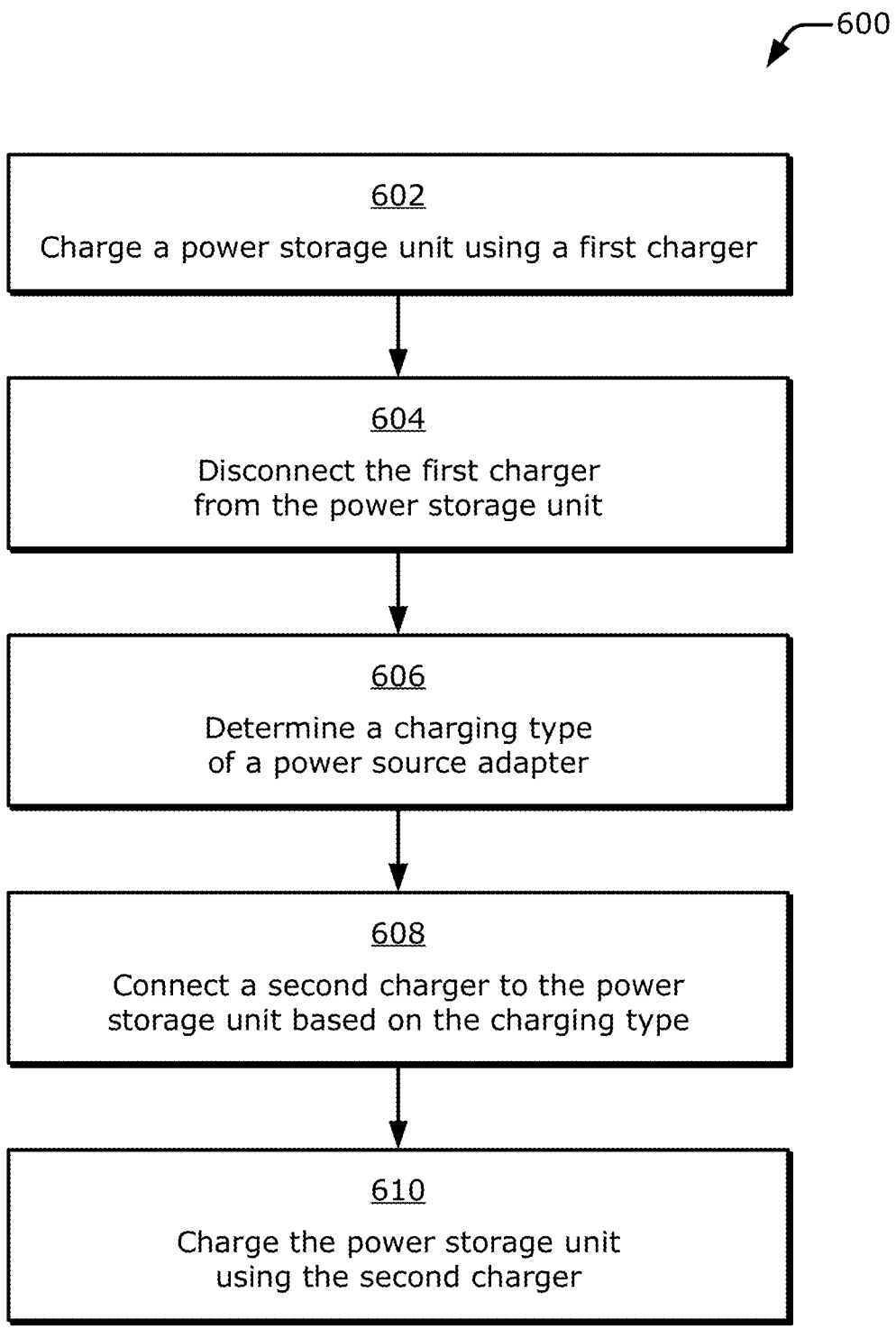
FIG. 6 is a flow diagram illustrating an example process for adaptively providing power.

FIG. 6 is a flow diagram illustrating an example process 600 for adaptively providing power. The process 600 is described in the form of a set of blocks 602-610 that specify operations that can be performed. However, operations are not necessarily limited to the order shown in FIG. 6 or described herein, for the operations may be implemented in alternative orders or in fully or partially overlapping manners. Also, more, fewer, and/or different operations may be implemented to perform the process 600 or an alternative process. Operations represented by the illustrated blocks of the process 600 may be performed by a power system 120 or a portion thereof, such as by two or more chargers 126-1 to 126-N and at least one switch 302.

At block 602, a power system is charging a power storage unit using a first charger. For example, a power system 120 can charge a power storage unit 122 using a first charger 126-1. A charging controller 128 may, for instance, establish a conducting path between a power adapter coupler 124 and the power storage unit 122, such as a battery 122-1 or 122-2, using at least one switch 302, with the conducting path including the first charger 126-1.

At block 604, the power system is disconnecting the first charger from the power storage unit. For example, the power system 120 can disconnect the first charger 126-1 from the power storage unit 122. This disconnection may be performed by opening the at least one switch 302, such as a switch 302-1, a switch 302-2, and so forth. The charging controller 128 may control the disconnection based on a state of charge of the battery, based on a current or voltage level, based on a change to whether a power source adapter 104 (or which power source adapter 104) is coupled to the system, a combination thereof, and so forth.

At block 606, the power system is determining a charging type of a power source adapter. For example, the power system 120 can determine a charging type 232 of a power source adapter 104 (PSA 104). In some cases, the charging controller 128 may determine the charging type 232 in response to a change in which power source adapter 104 is coupled to the power adapter coupler 124 of an electronic device 102. The charging controller 128 may make the determination through one or more communications with the power source adapter 104 (e.g., by receiving an advertised performance characteristic) or through testing the power source adapter 104 (e.g., to detect or otherwise obtain an estimated performance characteristic), including by using both a communication and testing.

At block 608, the power system is connecting a second charger to the power storage unit based on the charging type. For example, the power system 120 can connect a second charger 126-2 to the power storage unit 122 based on the charging type 232. To do so, the charging controller 128 may close at least one switch 302 (e.g., the switch 302-1 or the switch 302-2) to establish a conducting path between the power adapter coupler 124 and the power storage unit 122 using the at least one switch 302, with the conducting path including the second charger 126-2. The charging controller 128 can select the second charger 126-2 to match the charging type 232, such as variable voltage, constant voltage, constant current, a particular current range, and so forth.

At block 610, the power system is charging the power storage unit using the second charger. For example, the power system 120 can charge the power storage unit 122 using the second charger 126-2. In operation, the second charger 126-2 may route current from the power adapter coupler 124 to a power transistor 304 that gates access to the power storage unit 122. The current flow may be controlled at least partially by the power source adapter 104 that is currently coupled to the power adapter coupler 124, at least partially by the second charger 126-2, some combination thereof, and so forth.

Some aspects of example implementations are described below.

Example aspect 1: An apparatus for adaptively providing power, the apparatus comprising:
    a power adapter coupler;
    at least one transistor;
    a first charger coupled between the power adapter coupler and the at least one transistor;
    a second charger coupled between the power adapter coupler and the at least one transistor;
    a first switch coupled in series with the first charger between the power adapter coupler and the at least one transistor;

a second switch coupled in series with the second charger between the power adapter coupler and the at least one transistor; and a charging controller coupled to the first switch and the second switch, the charging controller configured to selectively:

close the first switch to connect the first charger to the at least one transistor; or close the second switch to connect the second charger to the at least one transistor.

Example aspect 2: The apparatus of example aspect 1, wherein the power adapter coupler comprises at least one of:

a socket configured to accept a plug of a charging cable; or an inductive loop configured to be electromagnetically coupled to a wireless power source adapter.

Example aspect 3: The apparatus of example aspect 1 or 2, further comprising:

at least one power storage unit, wherein:

the at least one transistor comprises a power field-effect transistor (FET), the power FET comprising a first channel terminal and a second channel terminal;

the first switch is coupled between the first charger and the first channel terminal of the power FET;

the second switch is coupled between the second charger and the first channel terminal of the power FET; and the power storage unit is coupled between the second channel terminal and a ground.

Example aspect 4: The apparatus of example aspect 3 or any one or more of the other preceding example aspects, wherein:

the power FET comprises a gate terminal;

the charging controller is coupled to the gate terminal of the power FET; and the charging controller is configured to selectively enable or disable current flow from the first charger or the second charger to the power storage unit using the gate terminal of the power FET.

Example aspect 5: The apparatus of example aspect 1 or any one or more of the other preceding example aspects, wherein:

the first charger comprises a switched-mode charger; and the second charger comprises a bypass charger.

Example aspect 6: The apparatus of example aspect 5 or any one or more of the other preceding example aspects, wherein the switched-mode charger comprises a buck-boost charger.

Example aspect 7: The apparatus of example aspect 1 or any one or more of the other preceding example aspects, wherein:

the first charger comprises a capacitive voltage-adjuster charger; and the second charger comprises a bypass charger.

Example aspect 8: The apparatus of example aspect 1 or any one or more of the other preceding example aspects, further comprising:

a third charger coupled between the power adapter coupler and the at least one transistor; and a third switch coupled in series with the third charger between the power adapter coupler and the at least one transistor, wherein:

the charging controller is coupled to the third switch; and the charging controller is configured to selectively close the third switch to connect the third charger to the at least one transistor.

Example aspect 9: The apparatus of example aspect 8 or any one or more of the other preceding example aspects, wherein:

the first charger comprises a switched-mode charger;

the second charger comprises a capacitive voltage-adjuster charger; and the third charger comprises a bypass charger.

Example aspect 10: The apparatus of example aspect 1 or any one or more of the other preceding example aspects, wherein the first charger comprises:

a multi-output charging circuit comprising a first output and a second output, the first output coupled to a first power domain, the second output coupled to a second power domain.

Example aspect 11: The apparatus of example aspect 10 or any one or more of the other preceding example aspects, wherein the multi-output charging circuit comprises:

a switched capacitive voltage-adjuster charger comprising the first output and the second output.

Example aspect 12: The apparatus of example aspect 10 or any one or more of the other preceding example aspects, wherein the multi-output charging circuit comprises:

a switched capacitive voltage-adjuster charger comprising the first output; and a step-down or step-up voltage regulator comprising the second output.

Example aspect 13: The apparatus of example aspect 1 or any one or more of the other preceding example aspects, wherein the charging controller is configured to:

connect at least one of the first charger or the second charger to the at least one transistor based on a charging type of a power source adapter that is coupled to the power adapter coupler.

Example aspect 14: The apparatus of example aspect 13 or any one or more of the other preceding example aspects, wherein the charging type of the power source adapter comprises at least one of:

a fixed-voltage charging type corresponding to one or more fixed voltages; or a variable-voltage charging type corresponding to one or more variable voltages.

Example aspect 15: The apparatus of example aspect 14 or any one or more of the other preceding example aspects, wherein the variable-voltage charging type comprises:

a first variable-voltage charging type configured to provide a first maximum voltage level; and a second variable-voltage charging type configured to provide a second maximum voltage level, the first maximum voltage level different from the second maximum voltage level.

Example aspect 16: The apparatus of example aspect 13 or any one or more of the other preceding example aspects, wherein the charging type of the power source adapter comprises at least one of:

a constant-voltage (CV) charging type; or a constant-current (CC) charging type.

Example aspect 17: The apparatus of example aspect 1 or any one or more of the other preceding example aspects, wherein the charging controller is configured to:

determine at least one estimated performance characteristic of a power source adapter that is coupled to the power adapter coupler; and charge a power storage unit using the power source adapter based on the at least one estimated performance characteristic.

Example aspect 18: The apparatus of example aspect 17 or any one or more of the other preceding example aspects, wherein the charging controller is configured to:
  receive from the power source adapter at least one indication of an advertised performance characteristic; and
  override the advertised performance characteristic based on the at least one estimated performance characteristic.

Example aspect 19: The apparatus of example aspect 18 or any one or more of the other preceding example aspects, wherein the advertised performance characteristic comprises at least one of:
  an ability to provide constant-current charging; or
  a capability to maintain a constant current within a current range comprising an upper current threshold level and a lower current threshold level.

Example aspect 20: The apparatus of example aspect 1 or any one or more of the other preceding example aspects, further comprising:
  a display screen coupled to the first charger or the second charger; and
  a processor operatively coupled to the display screen and configured to present one or more graphical images on the display screen,
  wherein the charging controller is configured to provide power to at least the display screen using the first charger or the second charger.

Example aspect 21: An apparatus for adaptively providing power, the apparatus comprising:
  means for coupling to a power source adapter;
  means for storing power;
  first means for charging the means for storing power;
  second means for charging the means for storing power;
  first means for selectively connecting the first means for charging to the means for storing power;
  second means for selectively connecting the second means for charging to the means for storing power; and
  means for controlling the first means for selectively connecting and the second means for selectively connecting based on a charging type of the power source adapter.

Example aspect 22: The apparatus of example aspect 21, wherein the means for controlling comprises:
  means for determining at least one estimated performance characteristic of the power source adapter; and
  means for controlling a charging of the means for storing power based on the at least one estimated performance characteristic.

Example aspect 23: The apparatus of example aspect 21 or 22, wherein the first means for charging comprises:
  means for outputting at least two voltages, a first voltage of the at least two voltages corresponding to a first power domain, and a second voltage of the at least two voltages corresponding to a second power domain.

Example aspect 24: A method for adaptively providing power, the method comprising:
  charging a power storage unit using a first charger;
  disconnecting the first charger from the power storage unit;
  determining a charging type of a power source adapter;
  connecting a second charger to the power storage unit based on the charging type; and
  charging the power storage unit using the second charger.

Example aspect 25: The method of example aspect 24, further comprising:
  providing, by the second charger, a first voltage to the power storage unit; and
  providing, by the second charger, a second voltage to at least one of a processor or a memory.

Example aspect 26: The method of example aspect 24 or 25, wherein the determining comprises:
  determining at least one estimated performance characteristic of the power source adapter.

Example aspect 27: An apparatus for adaptively providing power, the apparatus comprising:
  a power adapter coupler;
  a power storage unit;
  first circuitry corresponding to a first power domain;
  second circuitry corresponding to a second power domain; and
  a multi-output charging circuit comprising an input, a first output, and a second output, the input coupled to the power adapter coupler, the first output coupled to the power storage unit and the first circuitry, the second output coupled to the second circuitry, the multi-output charging circuit comprising:
    a capacitor array coupled between the input and the first output.

Example aspect 28: The apparatus of example aspect 27, wherein:
  the capacitor array comprises a first capacitor array; and
  the multi-output charging circuit comprises a second capacitor array coupled between the input and the second output.

Example aspect 29: The apparatus of example aspect 28 or 29, wherein:
  based on a power source adapter being coupled to the power adapter coupler, the multi-output charging circuit is configured to:
    adjust, using the first capacitor array, an input voltage by a first value to produce a first voltage for the first output; and
    adjust, using the second capacitor array, the input voltage by a second value to produce a second voltage for the second output, the first voltage being greater than the second voltage; and
  based on the power source adapter being uncoupled from the power adapter coupler, the multi-output charging circuit is configured to:
    adjust, using at least one of the first capacitor array or the second capacitor array, the first voltage by a third value to produce the second voltage for the second output, the first voltage corresponding to the power storage unit.

Example aspect 30: The apparatus of example aspect 27 or any one or more of the example aspects 28-29, wherein the multi-output charging circuit comprises:
  a step-down or step-up voltage regulator coupled between the input and the second output.

Example aspect 31: A method for adaptively powering an apparatus, the method comprising:
  obtaining at least one input parameter associated with a power source adapter that is connected to the apparatus;
  determining one or more charging capabilities of the connected power source adapter responsive to the at least one input parameter; and
  based on the determined one or more charging capabilities, activating circuitry to power the apparatus.

Example aspect 32: The method of example aspect 31, wherein:
  the determining comprises identifying a charging type of the connected power source adapter; and
  the activating comprises engaging a charger of the apparatus that corresponds to the identified charging type.

Example aspect 33: The method of example aspect 32 or 31, wherein the engaging comprises at least one of:
  selectively engaging a switching or buck-boost charger responsive to the connected power source adapter having a fixed-voltage charging type; or
  selectively engaging a bypassing or pass-through charger responsive to the connected power source adapter having a variable-voltage charging type.

Example aspect 34: The method of example aspect 31 or any one or more of the other preceding example aspects 31-33, wherein:
  the obtaining comprises receiving, from the connected power source adapter, an advertisement indicative of a charging mode capability;
  the determining comprises verifying the charging mode capability using at least one test; and
  the activating comprises engaging a charging mode of the apparatus that corresponds to a verified charging mode.

Example aspect 35: The method of example aspect 34 or any one or more of the other preceding example aspects 31-34, wherein:
  the verifying comprises testing the charging mode capability based on a comparison of an input current level and at least one current range; and
  the engaging comprises interfacing with the connected power source adapter in accordance with an adapter-based current-control mechanism responsive to an affirmative testing result.

Example aspect 36: The method of example aspect 35 or any one or more of the other preceding example aspects 31-35, wherein the engaging comprises interfacing with the connected power source adapter in accordance with an adapter-based voltage-control mechanism responsive to a negative testing result.

Example aspect 37: The method of example aspect 34 or any one or more of the other preceding example aspects 31-36, wherein the verifying comprises testing the charging mode capability based on a comparison of an input voltage level and at least one voltage range.

Example aspect 38: The method of example aspect 34 or any one or more of the other preceding example aspects 31-37, wherein the activating comprises instructing the power source adapter to ramp input voltage in steps.

Example aspect 39: The method of example aspect 34 or any one or more of the other preceding example aspects 31-38, wherein:
  the charging mode capability comprises a constant power charging mode; and
  the verifying comprises testing the constant power charging mode responsive to a request to change one of an input voltage or an input current.

Example aspect 40: The method of example aspect 31 or any one or more of the other preceding example aspects 31-39, wherein the determining comprises detecting if the power source adapter implements a constant power charging mode that is unadvertised.

Example aspect 41: The method of example aspect 31 or any one or more of the other preceding example aspects 31-40, wherein:
  the determining comprises requesting a charging voltage level from the connected power source adapter; and
  the activating comprises:
    engaging a switch capacitor to convert the charging voltage level to a higher-voltage level, the higher-voltage level lower than the charging voltage level;
    coupling the higher-voltage level to a battery;
    converting the charging voltage level to a lower-voltage level, the lower-voltage level lower than the higher-voltage level; and
    coupling the lower-voltage level to at least one voltage domain.

Example aspect 42: The method of example aspect 41 or any one or more of the other preceding example aspects 31-41, wherein the engaging comprises engaging a capacitor voltage divider to lower the charging voltage level to the higher-voltage level.

Example aspect 43: The method of example aspect 41 or any one or more of the other preceding example aspects 31-42, wherein the converting comprises at least one of:
  engaging another capacitor voltage divider to at least one of:
    lower the charging voltage level to the lower-voltage level; or
    lower the higher-voltage level to the lower-voltage level; or
  engage a step-down voltage regulator to at least one of:
    lower the charging voltage level to the lower-voltage level; or
    lower the higher-voltage level to the lower-voltage level.

Example aspect 44: The method of example aspect 41 or any one or more of the other preceding example aspects 31-43, wherein the at least one voltage domain comprises at least one power management integrated circuit (PMIC).

Example aspect 45: An apparatus configured to perform a method of any one or more of the preceding example aspects 24-26 and 31-44.

As used herein, "couple," "coupled," or "coupling" refers to a relationship between two or more components that are in operative communication magnetically, electromagnetically, or by being electrically connected to implement some feature or realize some capability that is described. The term "connect," "connected," or "connecting" refers to an electrical connection using a physical line, such as a metal trace or wire. In some cases, an electrical connection can include a resistor, a capacitor, an inductor, a transistor, and so forth. A connection can include a direct connection or an indirect connection. A direct connection refers to connecting discrete circuit elements via a same node without an intervening element. An indirect connection refers to connecting discrete circuit elements via one or more other devices or other discrete circuit elements. The terms "direct" and "indirect" may also modify or otherwise be applied to "coupling."

The terms "first," "second," "third," and other numeric-related indicators or differentiators are used herein to identify or distinguish similar or analogous items from one another within a given context. Such contexts can include a particular implementation, a given component, a single drawing figure or a group of related drawing figures, or a claim. Thus, a first item in one context may be the same as or may differ from a first item in another context. For example, an item identified as a "charger/first charger" or a "switch/first switch" in one context may be identified for clarity purposes as a "second charger" or a "second switch," respectively, in another context.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus for adaptively providing power, the apparatus comprising:
    a housing comprising:
        a power adapter coupler;
        at least one transistor;
        a first charger coupled between the power adapter coupler and the at least one transistor;
        a second charger coupled between the power adapter coupler and the at least one transistor;
        a first switch coupled in series with the first charger between the power adapter coupler and the at least one transistor, the first switch separate from the first charger;
        a second switch coupled in series with the second charger between the power adapter coupler and the at least one transistor, the second switch separate from the second charger; and
        a charging controller coupled to the first switch and the second switch, the charging controller configured to selectively:
            close the first switch to connect the first charger to the at least one transistor; or
            close the second switch to connect the second charger to the at least one transistor.

2. The apparatus of claim 1, wherein the power adapter coupler comprises at least one of:
    a socket configured to accept a plug of a charging cable; or
    an inductive loop configured to be electromagnetically coupled to a wireless power source adapter.

3. The apparatus of claim 1, further comprising:
    at least one power storage unit, wherein:
    the at least one transistor comprises a power field-effect transistor (FET), the power FET comprising a first channel terminal and a second channel terminal;
    the first switch is coupled between the first charger and the first channel terminal of the power FET;
    the second switch is coupled between the second charger and the first channel terminal of the power FET; and
    the at least one power storage unit is coupled between the second channel terminal and a ground.

4. The apparatus of claim 3, wherein:
    the power FET comprises a gate terminal;
    the charging controller is coupled to the gate terminal of the power FET; and
    the charging controller is configured to selectively enable or disable current flow from the first charger or the second charger to the at least one power storage unit using the gate terminal of the power FET.

5. The apparatus of claim 1, wherein:
    the first charger comprises a switched-mode charger; and
    the second charger comprises a bypass charger.

6. The apparatus of claim 5, wherein the switched-mode charger comprises a buck-boost charger.

7. The apparatus of claim 1, wherein:
    the first charger comprises a capacitive voltage-adjuster charger; and
    the second charger comprises a bypass charger.

8. The apparatus of claim 1, further comprising:
    a third charger coupled between the power adapter coupler and the at least one transistor; and
    a third switch coupled in series with the third charger between the power adapter coupler and the at least one transistor, wherein:
    the charging controller is coupled to the third switch; and
    the charging controller is configured to selectively close the third switch to connect the third charger to the at least one transistor.

9. The apparatus of claim 8, wherein:
    the first charger comprises a switched-mode charger;
    the second charger comprises a capacitive voltage-adjuster charger; and
    the third charger comprises a bypass charger.

10. The apparatus of claim 1, wherein the first charger comprises:
    a multi-output charging circuit comprising a first output and a second output, the first output coupled to a first power domain, the second output coupled to a second power domain.

11. The apparatus of claim 10, wherein the multi-output charging circuit comprises:
    a switched capacitive voltage-adjuster charger comprising the first output and the second output.

12. The apparatus of claim 10, wherein the multi-output charging circuit comprises:
    a switched capacitive voltage-adjuster charger comprising the first output; and
    a step-down or step-up voltage regulator comprising the second output.

13. The apparatus of claim 1, wherein the charging controller is configured to:
    connect at least one of the first charger or the second charger to the at least one transistor based on a charging type of a power source adapter that is coupled to the power adapter coupler.

14. The apparatus of claim 13, wherein the charging type of the power source adapter comprises at least one of:
    a fixed-voltage charging type corresponding to one or more fixed voltages; or
    a variable-voltage charging type corresponding to one or more variable voltages.

15. The apparatus of claim 14, wherein the variable-voltage charging type comprises:
    a first variable-voltage charging type configured to provide a first maximum voltage level; and
    a second variable-voltage charging type configured to provide a second maximum voltage level, the first maximum voltage level different from the second maximum voltage level.

16. The apparatus of claim 13, wherein the charging type of the power source adapter comprises at least one of:
    a constant-voltage (CV) charging type; or
    a constant-current (CC) charging type.

17. The apparatus of claim 1, wherein the charging controller is configured to:

determine at least one estimated performance characteristic of a power source adapter that is coupled to the power adapter coupler; and charge a power storage unit using the power source adapter based on the at least one estimated performance characteristic.

18. The apparatus of claim 17, wherein the charging controller is configured to:
receive from the power source adapter at least one indication of an advertised performance characteristic; and
override the advertised performance characteristic based on the at least one estimated performance characteristic.

19. The apparatus of claim 18, wherein the advertised performance characteristic comprises at least one of:
an ability to provide constant-current charging; or
a capability to maintain a constant current within a current range comprising an upper current threshold level and a lower current threshold level.

20. The apparatus of claim 1, further comprising:
a display screen coupled to the first charger or the second charger; and
a processor operatively coupled to the display screen and configured to present one or more graphical images on the display screen,
wherein the charging controller is configured to provide power to at least the display screen using the first charger or the second charger.

21. An apparatus for adaptively providing power, the apparatus comprising:
a housing comprising:
a power adapter coupler configured to couple to a power source adapter;
at least one transistor;
a first charger coupled between the power adapter coupler and the at least one transistor;
a second charger coupled between the power adapter coupler and the at least one transistor;
a first switch coupled in series with the first charger between the power adapter coupler and the at least one transistor, the first switch separate from the first charger;
a second switch coupled in series with the second charger between the power adapter coupler and the at least one transistor, the second switch separate from the second charger;
a charging controller coupled to the first switch and the second switch, the charging controller configured to selectively:
close the first switch to connect the first charger to the at least one transistor; or
close the second switch to connect the second charger to the at least one transistor; and
means for controlling the first switch and the second switch based on a charging type of the power source adapter.

22. The apparatus of claim 21, wherein the means for controlling comprises:
means for determining at least one estimated performance characteristic of the power source adapter; and
means for controlling a charging of at least one power storage unit based on the at least one estimated performance characteristic.

23. The apparatus of claim 21, wherein the first charger comprises:
means for outputting at least two voltages, a first voltage of the at least two voltages corresponding to a first power domain, and a second voltage of the at least two voltages corresponding to a second power domain.

24. An apparatus for adaptively providing power, the apparatus comprising:
a housing comprising:
a power adapter coupler;
a power storage unit;
at least one transistor;
a first charger coupled between the power adapter coupler and the at least one transistor;
a second charger coupled between the power adapter coupler and the at least one transistor;
a first switch coupled in series with the first charger between the power adapter coupler and the at least one transistor, the first switch separate from the first charger;
a second switch coupled in series with the second charger between the power adapter coupler and the at least one transistor, the second switch separate from the second charger;
a charging controller coupled to the first switch and the second switch, the charging controller configured to selectively:
close the first switch to connect the first charger to the at least one transistor; or
close the second switch to connect the second charger to the at least one transistor;
first circuitry corresponding to a first power domain; and
second circuitry corresponding to a second power domain,
the first charger comprising a multi-output charging circuit comprising an input, a first output, and a second output, the input coupled to the power adapter coupler, the first output coupled to the power storage unit and the first circuitry, the second output coupled to the second circuitry, the multi-output charging circuit comprising:
a capacitor array coupled between the input and the first output.

25. The apparatus of claim 24, wherein:
the capacitor array comprises a first capacitor array; and
the multi-output charging circuit comprises a second capacitor array coupled between the input and the second output.

26. The apparatus of claim 25, wherein:
based on a power source adapter being coupled to the power adapter coupler, the multi-output charging circuit is configured to:
adjust, using the first capacitor array, an input voltage by a first value to produce a first voltage for the first output; and
adjust, using the second capacitor array, the input voltage by a second value to produce a second voltage for the second output, the first voltage being greater than the second voltage; and
based on the power source adapter being uncoupled from the power adapter coupler, the multi-output charging circuit is configured to:
adjust, using at least one of the first capacitor array or the second capacitor array, the first voltage by a third value to produce the second voltage for the second output, the first voltage corresponding to the power storage unit.

27. The apparatus of claim 24, wherein the multi-output charging circuit comprises:

a step-down or step-up voltage regulator coupled between the input and the second output.

* * * * *